US007036460B2

(12) United States Patent
Ducharme et al.

(10) Patent No.: US 7,036,460 B2
(45) Date of Patent: May 2, 2006

(54) THROAT SUPPORT DEVICE AND METHODS OF USING SAME

(75) Inventors: Norm G. Ducharme, Ithaca, NY (US);
Richard P. Hackett, Ithaca, NY (US);
J. Brett Woodie, Georgetown, KY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 44 days.

(21) Appl. No.: 10/754,898

(22) Filed: Jan. 9, 2004

(65) Prior Publication Data
US 2005/0085753 A1    Apr. 21, 2005

Related U.S. Application Data

(60) Provisional application No. 60/439,242, filed on Jan. 10, 2003.

(51) Int. Cl.
*A01K 13/00* (2006.01)
*B68B 1/00* (2006.01)

(52) U.S. Cl. ............... 119/828; 119/821; 54/6.1; 54/71

(58) Field of Classification Search .......... 54/6.1, 54/14, 15, 57, 71; 119/821, 828, 829
See application file for complete search history.

(56) References Cited

U.S. PATENT DOCUMENTS 78,155 A * 5/1868 Sullivan .................. 119/829

| 195,667 A | | 9/1877 | Snead et al. ............. 119/821 |
| 865,308 A | * | 9/1907 | Knight et al. ............ 54/6.1 |
| 2,669,816 A | * | 2/1954 | Pletsch .................. 54/6.1 |
| 5,434,829 A | | 7/1995 | Maeda et al. ............. 369/48 |
| 5,460,125 A | | 10/1995 | Lookingbill ............. 119/821 |

OTHER PUBLICATIONS

Ahern, T. J., "Oral Palatopharyngoplasty: A survey of one hundred post-operative raced horses", *Journal of Equine Veterinary Science, 13 (12)*, (Dec. 1993),670-672.

Ducharme, Norm G., et al., "Intermittent Dorsal Displacement of the Soft Palate", in *Current Therapy in Equine Medicine, 4*, N. E. Robinson (ed.), W.B. Saudners Company, Philadelphia, PA,(1997),415-418.

Holcombe, Susan J., et al., "Pharynx", in *Textbook Equine Surgery, 2nd edition, Chapter 34*, Auer J.A., Stick J.A. (eds). WB Saunders co., Philadelphia,(1999),337-348.

(Continued)

*Primary Examiner*—Robert P. Swiatek
(74) *Attorney, Agent, or Firm*—Schwegman, Lundberg, Woessner & Kluth, P.A.

(57) ABSTRACT

A throat support device comprising a main throat support section having one or more lifting mechanisms, each with a tip, each tip adapted to fit into a location immediately adjacent to and behind a basihyoid bone, a thyroid cartilage and/or a cricoid cartilage of an animal to control upper airway dysfunction. In one embodiment, the throat support device further comprises a bridle. In one embodiment, the upper airway dysfunction is dorsal displacement of the soft palate (DDSP) and the animal is a horse. Unlike conventional treatments involving surgery, the throat support device provides a non-invasive and convenient means of diagnosing and treating upper airway dysfunctions.

71 Claims, 10 Drawing Sheets

OTHER PUBLICATIONS

Sisson, Septimus, et al., "Equine mycology in The anatomy of domestic animals", *Sisson and Grossman's The Anatomy of the Domestic Animals*, Gett R., (ed). WB Saunders co., Philadelphia,(1975),3 pages.

* cited by examiner

THROAT SUPPORT DEVICE AND METHODS OF USING SAME

CROSS REFERENCE TO RELATED APPLICATIONS

This application claims the benefit under 35 U.S.C. 119 (e) of U.S. Provisional Application No. 60/439,242 filed on Jan. 10, 2003, which is hereby incorporated by reference in its entirety.

TECHNICAL FIELD

The present subject matter relates generally to support devices, and, more particularly, to a throat support device and methods of using same.

BACKGROUND

There are many conditions or diseases affecting the patency or openness of the upper airways and the neck region that cause numerous problems for both animals and humans. One well-documented disease that occurs primarily in horses is known as intermittent dorsal displacement of the soft palate (DDSP). DDSP results in an expiratory upper-airway obstruction that is often associated with an expiratory noise in horses during exercise. Horses typically present with a complaint of impaired performance and/or upper respiratory noise. It is thought that DDSP occurs near the end of maximal exercise intensity but it is seen earlier in some horses and also at less than maximal exercise. Because of the immediate marked effect of DDSP on ventilation, decreased performance is seen soon after its occurrence and is more obvious in horses performing at maximal exercise intensity. Respiratory noise associated with DDSP resembles a flutter or snoring coming from the back of the throat. However the sound is not always present or reported by the trainer/owner. Some trainers report that DDSP occurs as a result of a sudden event during the end of competition. It appears that if the concentration of the animal can be maintained, i.e. there is no change in demand placed in the horse, the horse will not experience DDSP and can compete successfully.

As the horse inhales and exhales, air pumps in and out of the lungs through the larynx (voice box) and the airflow is directed to the nasopharynx located above the soft palate and the epiglottis. The airflow can catch and lift the palate on exhalation so that half or more of the airway is blocked. As a result of this observation, it was originally thought that DDSP was caused by an abnormal soft palate that was either weak or elongated. It is also known that inflammation of the airway (pharyngitis) can trigger some DDSP cases by damaging the function of the nerve supply to the soft palate, although most horses with DDSP do not experience such inflammation.

As general management of this condition, a tongue-tie is often placed on the affected animal. The tongue-tie consists of a band of material (generally of cotton material) applied around the tongue in a constricting matter and fixing it to the bottom jaw. This results in reversible interference of the blood supply to the tongue and exterior position of the tongue. This clearly raise question of humane treatment as this blue tongue protrudes from the mouth of the animal during competition. This frequent treatment is thought to improve the patency of the upper airway and prevent swallowing of the tongue (an unproven condition yet still part of popular belief). Other attempts at solving this problem include positioning a coffee can (or similar device) under the horse's throat to prevent it from bending its neck, and other homemade measures. None of these attempts have enjoyed proven success and can also be uncomfortable for the horse.

Additionally, in spite of the often poor knowledge as to what precisely causes DDSP, various surgical procedures are often used in an attempt to correct DDSP. Surgery to remove a small section of the palate, i.e., staphylectomy, seems to help about 60 percent of the time. Another surgery that involves cutting the strap muscles on the lower side of the neck, to prevent the larynx from slipping back and away, i.e., a sternothyroid muscle resection, is also helpful about 60 percent of the time. Some practitioners perform both procedures, but the success rate with the combination surgery remains about 60 percent.

With no surgical treatment of intermittent DDSP being entirely satisfactory, investigators continue to seek alternative therapies. For example, one method involves attempting to stiffen the palate through injection of various materials directly into the palate or by cauterization or lasering of the soft palate. Such procedures also have a success rate of about 60%.

It should also be noted that animals other than horses can experience DDSP. Additionally, these animals can experience other problematic conditions of the upper airway. These include, but are not limited to, snoring, sleep apnea, dynamic nasopharyngeal and velopharyngeal collapse and the like.

For the reasons stated above, and for other reasons stated below which will become apparent to those skilled in the art upon reading and understanding the present specification, there is a significant need in the art for a practical and effective non-invasive means for diagnosing and treating upper airway dysfunction in animals.

SUMMARY

A throat support device comprising a main throat support section having one or more lifting mechanisms, each with a tip, each tip adapted to fit into a location immediately adjacent to and behind a basihyoid bone, a thyroid cartilage or a cricoid cartilage of an animal to control upper airway dysfunction is disclosed. In one embodiment, the tip of at least one of the one or more lifting mechanisms is adjustable in an upwardly or downwardly direction with an adjustment mechanism. In one embodiment, the adjustment mechanism is a ramp system comprised of an L-shaped piece of material that elevates or ramps the tip up when a securing mechanism is tightened. In another embodiment the adjustment mechanism is an adjusting screw that elevates the tip when rotated in one direction. Each tip of the one or more lifting mechanisms, when adjusted upwardly, is designed to apply pressure to the location immediately adjacent to and behind the basihyoid bone, the thyroid cartilage and/or the cricoid cartilage at a level sufficient to control the upper airway dysfunction by preventing caudal and ventral displacement of these structures.

In another embodiment, each lifting mechanism is also adjustable in position in a longitudinal direction. In the embodiment in which the adjustment mechanism is a ramp system, the adjustment mechanism can further optionally contain a slot adapted to receive one or more securing screws, further wherein the lifting mechanism (located adjacent to the adjustment mechanism) is slideable in a longitudinal direction when the securing screws are loosened or not present. In the embodiment in which the adjusting mechanism is an adjusting screw, each lifting mechanism can further have a longitudinal slot adapted to receive one or more securing screws, further wherein each lifting mechanism is slideable in a longitudinal direction when the securing screws are loosened or not present.

A throat support device comprising lifting means for applying pressure immediately adjacent to and behind the basihyoid bone, thyroid cartilage or cricoid cartilage of an animal, the lifting means connectable to the throat support device; and securing means for securing the throat support device in place in a forward direction is also disclosed.

The invention further comprises a device comprising a throat support device having one or more lifting mechanisms; and one or more lifting straps securable to the throat support device. The invention further comprises a device comprising a throat support device having one or more lifting mechanisms; headgear connectable to the throat support device; and one or more lifting straps securable to the throat support device and the headgear. A device comprising a throat support device having one or more lifting mechanisms; and a bit strap connectable to the throat support device is also disclosed.

The invention further includes, in one embodiment, a method for diagnosing and treating upper airway dysfunction comprising fitting a throat support device underneath a throatlatch of a subject, the throat support device having one or more lifting mechanisms, each of the one or more lifting mechanisms having a tip, wherein the throatlatch includes a basihyoid bone, a thyroid cartilage and a cricoid cartilage; placing each tip of the one or more lifting mechanisms adjacent to and behind a location selected from the group consisting of the basihyoid bone, the thyroid cartilage and the cricoid cartilage; elevating at least one tip of the one or more lifting mechanisms with an adjustment mechanism wherein the at least one tip is pressed up into and behind the location selected from the group consisting of the basihyoid bone, the thyroid cartilage and the cricoid cartilage; exercising the subject at a level sufficient to induce the upper airway dysfunction; and observing the subject to determine if the upper airway dysfunction is occurring.

The invention further includes, in one embodiment, a method of treating an upper airway dysfunction or maintaining upper airway patency in an animal comprising fitting a throat support device underneath a throatlatch of a subject, the throat support device having one or more lifting mechanisms, each with a tip, wherein the throatlatch includes a basihyoid bone, a thyroid cartilage and a cricoid cartilage; placing each tip of the one or more lifting mechanisms adjacent to and behind a location selected from the group consisting of the basihyoid bone, the thyroid cartilage and the cricoid cartilage; and elevating at least one tip of the one or more lifting mechanisms with an adjustment mechanism wherein the at least one tip is pressed up into and behind the location selected from the group consisting of basihyoid bone, the thyroid cartilage and the cricoid cartilage with a pressure sufficient to prevent the upper airway dysfunction during subsequent exercise. The invention further includes, in one embodiment, a method of treating dorsal displacement of a soft palate with greater than 90% effectiveness.

In one embodiment, the invention provides a method of controlling or preventing inappropriate swallowing. In one embodiment, the invention is used as a cribbing strap in order to control cribbing. In such embodiments, it is likely a figure-eight noseband would not be used, so that the animal can eat while wearing the device.

Unlike conventional treatments involving surgery, the throat support device provides a non-invasive and convenient means of diagnosing and treating upper airway dysfunctions. The throat support device has the additional advantage of having a success rate in treating DDSP in excess of 90%, as compared with only 60% for conventional surgeries. The throat support device is also a much more reliable, practical and humane solution to the problem as compared with homemade solutions including tongue tying, inserting objects under an animal's throat (e.g., coffee cans), and so forth. In some embodiments, as described above, the throat support device further includes a bit strap, thus providing a novel bridle for use with horses having these problems. In a further embodiment, the invention further comprises and can be sold together with a suitably-sized bit.

The throat support device provides and safe and consistent solution to diagnosing and treating various upper airway dysfunctions, including the well-known problem of DDSP. The ability to diagnose and treat this condition is particularly advantageous for racehorses that must be able to maintain a full airflow throughout a race in order to remain competitive. In competitions in which throat support devices are not permitted, the device can still be used to diagnosis DDSP or other upper airway dysfunctions so that alternative means of treatment can be sought.

DETAILED DESCRIPTION

In the following detailed description of embodiments of the invention, reference is made to the accompanying drawings that form a part hereof, and in which is shown by way of illustration specific preferred embodiments in which the subject matter may be practiced. These embodiments are described in sufficient detail to enable those skilled in the art to practice them, and it is to be understood that other embodiments may be utilized and that mechanical, chemical, structural, electrical, and procedural changes may be made without departing from the spirit and scope of the present subject matter. The following detailed description is, therefore, not to be taken in a limiting sense, and the scope of embodiments of the present invention is defined only by the appended claims, along with the full scope of equivalents to which such claims are entitled.

Definitions

As used herein, the term "upper airway" refers to all anatomical structures of the airway (e.g., nare or nostril, nasal cavity, nasal septum, nasopharynx, glottis, larynx and extra-thoracic trachea, further including associated musculatures nerves and support structures, and the like) from the extra-thoracic trachea to the nose.

As used herein, the term "upper airway dysfunction" refers to any disease or anomaly of the upper airway that interferes with respiratory function and leads to changes in airflow and/or airway pressures. The anomaly may be dynamic, such as DDSP, or rigid, such as a tumor or other malformation As used herein, the term "throatlatch" refers to a throat area of the horse or human. In an animal, such as a horse, the throatlatch is the bottom part of the horse's throat at the junction of the neck and the head. The throatlatch includes the structures of the respiratory system (basihyoid bone, laryngeal cartilages, and proximal trachea) and of the digestive system (esophagus, cricopharyngeal sphincter) and associated musculature, nerves, and blood vessels.

As used herein the term "headgear" refers to a bridle, halter, any halter-like device, any type of noseband (e.g., figure-eight noseband), and the like.

It should be understood that the term "longitudinal," as used herein, means of or relating to length or the lengthwise direction, and in particular, the direction running between the front and back of the animal. The term "laterally," as used herein means situated on, directed toward or running from side to side, and in particular, a direction running from left to right (or right to left) of an animal. The terms "bottom," "top," "inner," and "outer" as used herein are intended to indicate the direction relative to the animal wearing a throat support device over the throat region. For example, the terms "inner" and "bottom" refer to a "bodyside," which means the side closest to the body of the animal, while the terms "outer" and "top" refer to a "visible side," which means the exposed side, i.e., the side away from the body.

DESCRIPTION OF THE EMBODIMENTS

Figure 1A:
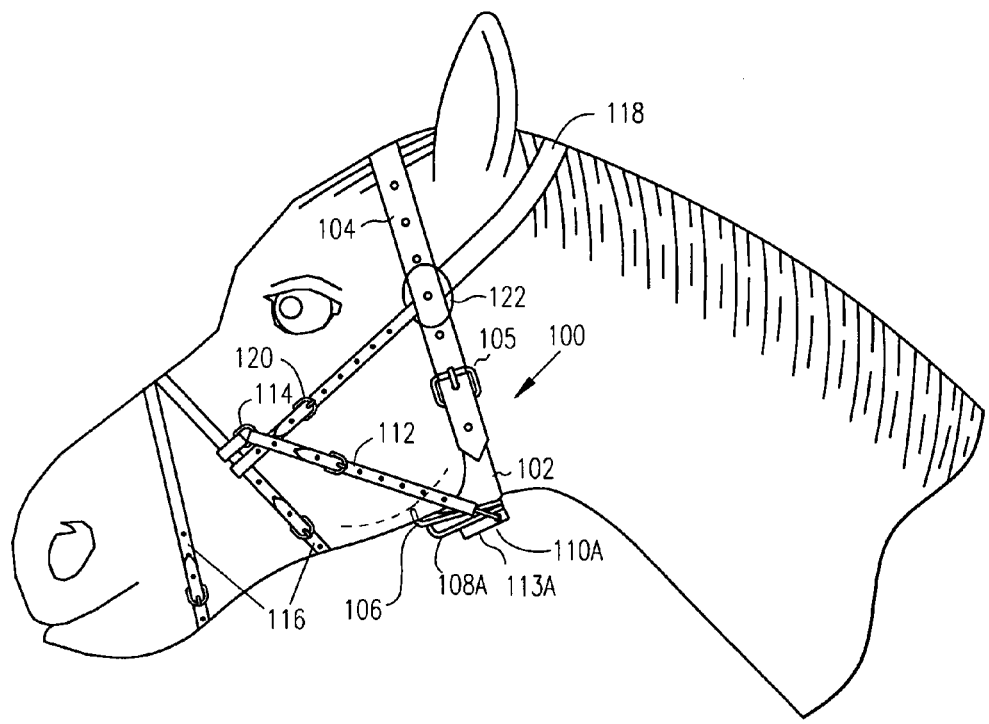
FIG. 1A is a simplified illustration of a throat support device in place on an animal, the throat support device having an adjustment mechanism comprising an L-shaped component used to elevate and lower the lifting mechanism, in accordance with one embodiment of the invention.

A throat support device is disclosed. As shown in FIG. 1A, the throat support device 100 comprises a main throat support section 102 and a head strap 104 having a closure device 105. The main throat support section 102 includes a lifting mechanism 106, an adjustment mechanism 108A, and a first securing device 110A designed to hold one or more lifting straps 112 in a fixed position. The first securing device 110A is held in place with a first securing device holder 113A. The one or more lifting straps 112 are also held in place by second securing devices 114 (only one shown), which in turn are connected to a second securing device holder 116, which in this embodiment is a noseband portion of a figure-eight noseband. It is important that the throat support device 100 remain in place during use, including during intensive exercise, such as horse racing. Any suitable securing means can be used, and the precise design and configuration is dependent on the anatomy of the particular animal to which the throat support device 100 is being secured.

Figure 3A:
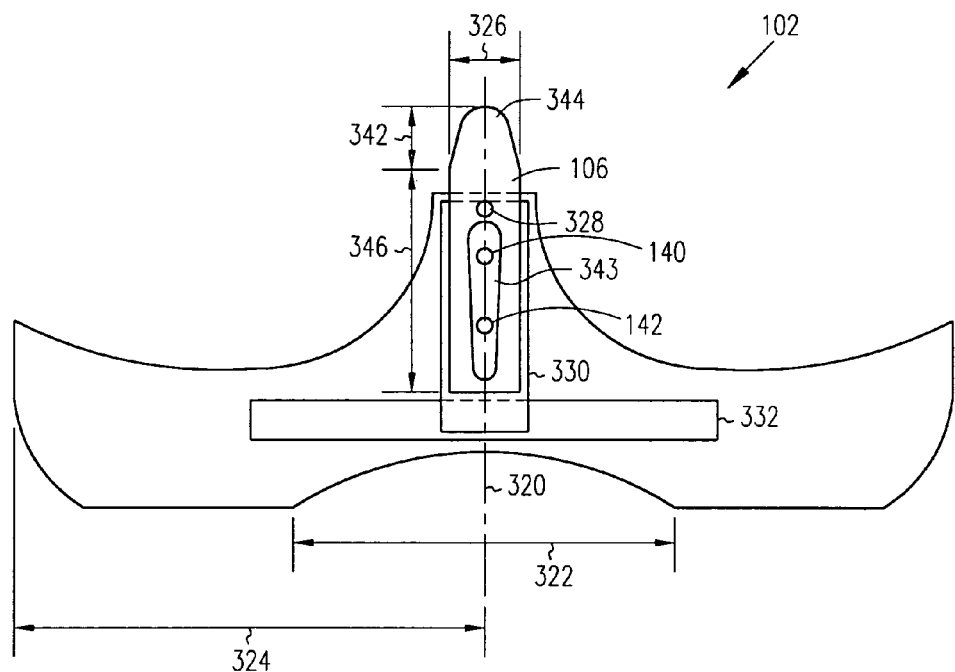
FIG. 3A is a bottom view of a main section of the throat support device of FIG. 1C, in accordance with one embodiment of the invention.

In the embodiment shown in FIG. 1A, the animal is a horse and the securing means includes the first and second securing devices, 110A and 114, respectively, the first and second securing device holders, 113A and 116, respectively and a single lifting strap 112 that extends from one side of the horse to the other. More precisely, in the particular embodiment shown in FIG. 1A, the first securing device holder 113A is a rectangular block and the first securing device 110A is a channel through the rectangular block into which the lifting strap 112 is threaded. In this embodiment, only a portion of the lifting strap 112 is a conventional strap, such as a leather strap, with the remaining portion threaded through the channel, i.e., the first securing device 110A, and having a different, smaller geometry. In one embodiment the portion of the lifting strap 112 which threads through the channel and extends slightly beyond on either side of the channel, is a rope. As FIG. 1A shows, in this embodiment, the lifting strap 112 is held in place on each end with the second securing devices 114 (only one shown), which in this embodiment are buckles, each made from a loop of leather. In an alternative embodiment a D-ring or any other type of attachment mechanism is used. (The one or more lifting straps 112 can alternately be secured with the second securing devices 114 anywhere along another portion of the noseband, i.e., a securing strap 118, with one possible location shown in FIG. 1C). In this embodiment, the second securing device holder 116 is part of a particular type of headgear known as a figure-eight nose-band, although the invention is not so limited as will be discussed in more detail herein. The adjustment mechanism 108A in this embodiment is an L-shaped component made from a rigid L-shaped piece of material that elevates or ramps up the lifting mechanism 106 (as it moves in a rearward direction) when the first securing device 110A is tightened with one or more securing screws, such as the first and second securing screws, 140 and 142, respectively (shown in FIG. 1B). Note that this adjustment mechanism 108A can be made from any of the materials discussed herein for the lifting mechanism 106 or even the reinforcement section 330 (FIG. 3A). The adjustment mechanism 108A can be any suitable size and shape as long as it can perform the intended function, and in some embodiments is about the same width and thickness as the lifting mechanism 106, although the invention is not so limited. The adjustment mechanism 108A can either be shorter in length or arranged in the throat support device 100 to not extend as far as the lifting mechanism 106, so that it is properly positioned to provide the requisite support and lift to the lifting mechanism 106.

Figure 1B:
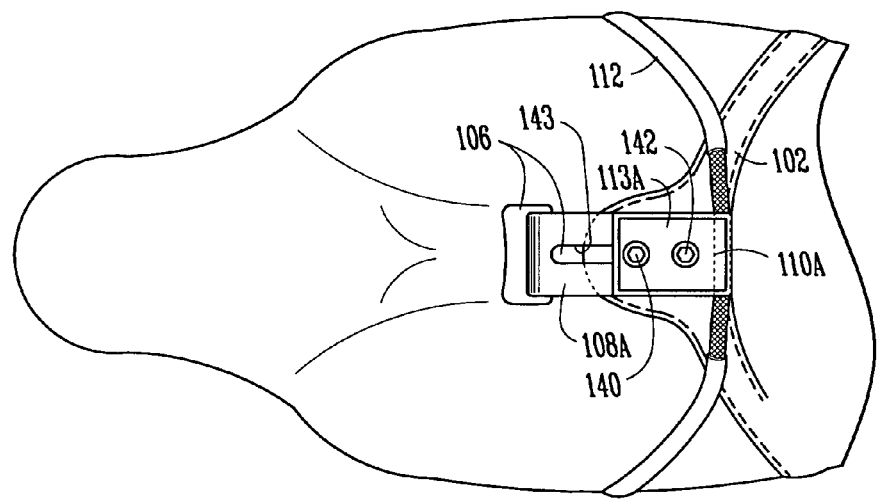
FIG. 1B is a bottom view of the throat support device of FIG. 1A in place on an animal, in accordance with one embodiment of the invention.

As shown in FIG. 1B, the first and second securing screws 140 and 142 are not only used to secure the first securing device 110A onto the main throat support section 102, but to further allow the adjustment mechanism 108A to provide lift to the lifting mechanism 106 when tightened. In embodiments in which the adjustment mechanism 108A is the L-shaped component, the adjustment mechanism 108A itself can further optionally contain a slot 143 along which the adjacent lifting mechanism 106 is slideable front to back. Additionally or alternatively, the slot 143 can be contained in an additional support mechanism, such as a steel plate 330 (shown in FIG. 3A). Such a support mechanism can be placed between the main throat support section 102 and the first securing device 110A.

Figure 1C:
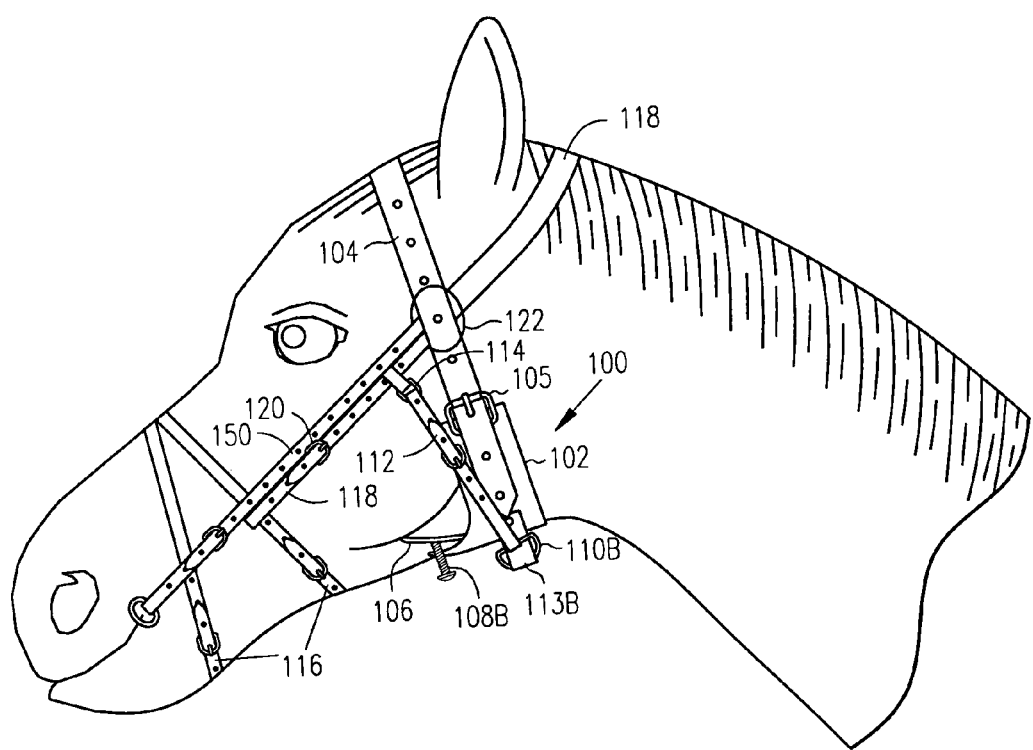
FIG. 1C is a simplified illustration of a throat support device in place on an animal, the throat support having an adjustment mechanism comprising an adjusting screw used to elevate and lower the lifting mechanism, in accordance with one embodiment of the invention.

In an alternative embodiment, as shown in FIG. 1C, the first securing device 110B is a D-ring held in place with a fastening means, such as a rivet, and the first securing device holder 113B is a loop of leather. In this embodiment, the second securing device 114 is a D-ring on a loop of leather, although in other embodiments, the second securing device 114 could alternately be any other suitable type of fastening device known in the art. Also in this embodiment, there is a lifting strap 112 which extends from one of the second securing devices 114, through the first securing device 110B to the other second securing device 114 (not shown). However, it would be possible to again use two separate lifting straps 112 on each side of the horse that are both secured to the first securing device 110B and attached at each end to the second securing device 114 located on their respective side. In this embodiment, the second securing device holder 116 is again a figure-eight nose-band, although the invention is not so limited.

Figure 2:
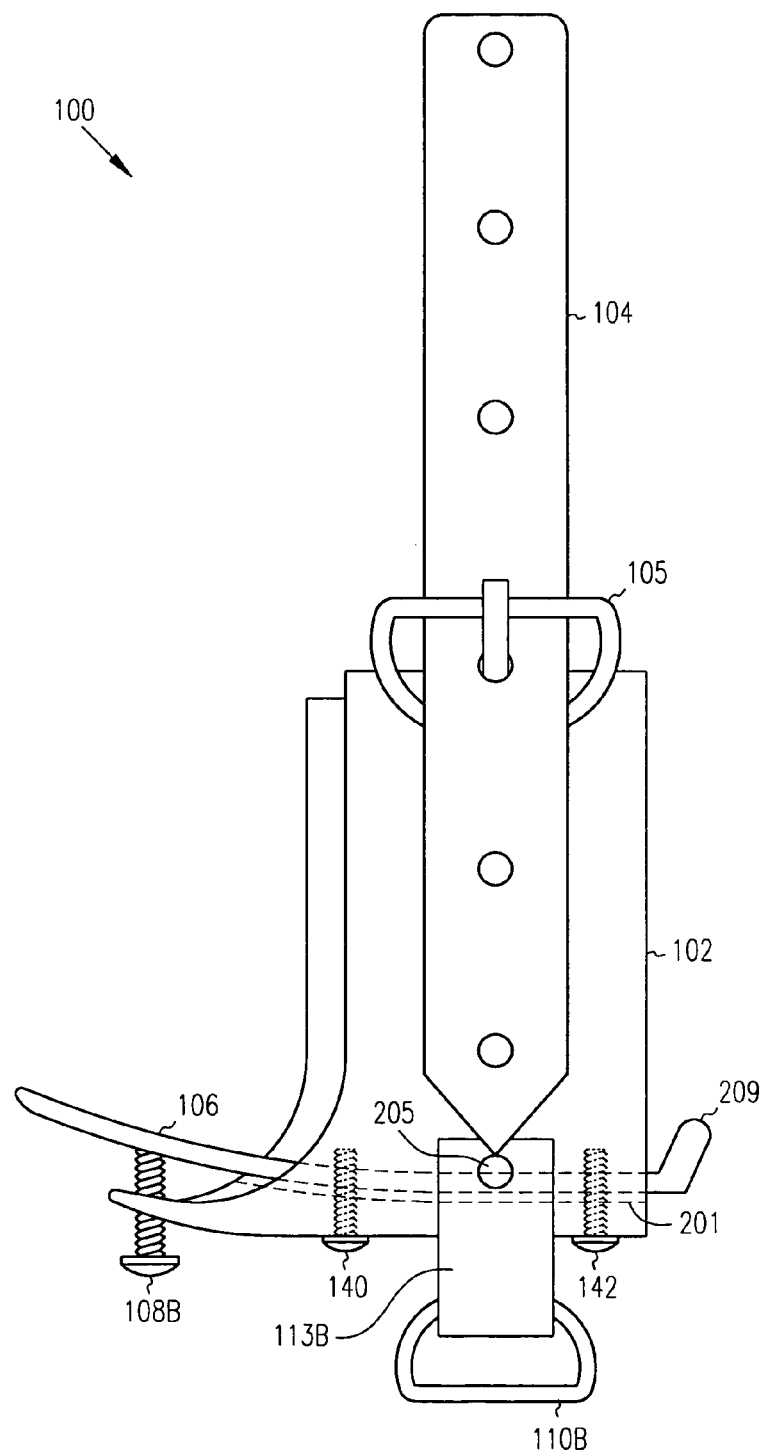
FIG. 2 is a simplified perspective view of the throat support device of FIG. 1C in accordance with one embodiment of the invention.

In this embodiment, as shown in FIGS. 1C and 2, the adjustment mechanism 108B is an adjusting screw that provides increasing lift to the lifting mechanism 106 when tightened. Again, the precise location of the one or more lifting straps 112 along the securing strap 118 can vary. In this embodiment, however, the lifting straps 112 are shown in a more rearward position along the securing strap 118, which may be a useful location for horses with more caudal basihyoid bones, such as thoroughbred horses. With other animals, such as horses having more forward basihyoid bones, e.g., standardbred horses, it may be more advantageous to secure the one or more lifting straps 112 further forward along the securing strap 118 or on another portion of the second securing device holder 116 altogether, such as the noseband portion, as shown in FIG. 1A. In this embodiment, the throat support device 100 further comprises a bit strap 150 (which actually splits off from the securing strap 118 as shown), thus having the additional advantage of serving as a bridle. In this particular embodiment, the bit strap 150 is being used in addition to the figure eight nose-band, although it can be used as a second securing device 116 alone, i.e., as an alternative to the figure-eight nose band, as is discussed further below.

Referring again to FIG. 1A or FIG. 1C, the noseband portion of the figure-eight nose band is being used as the second securing device holder 116 in both embodiments. The figure-eight nose band shown comprises the second securing device holder 116, i.e., the noseband portion and the securing strap 118 having a securing strap adjuster 120, such as a buckle. The securing strap 118 is securable to the headstrap 104 with suitable strap securing means 122, such as a loop of material as is known in the art. In this embodiment, the one or more lifting straps 112, when properly secured as described herein, keeps the throat support device 100 in a fixed or forward position, allowing the throat support device 100 in turn to keep the basihyoid bone and the larynx forward and upward, the rostral aspect of the thyroid cartilage immediately dorsal to the basihyoid bone, and the forward tip of the epiglottis in front of or at the level of the front of the stylohyoid bone as described herein (See FIG. 5). In another embodiment, there are two first securing devices 110A or 110B (and two first securing device holders 113A or 113B) each located more to opposing sides of the animal, such that the one or more lifting straps 112 are held in place with two first securing devices (which can be of the type 110A, 110B or a combination thereof).

Figure 1D:
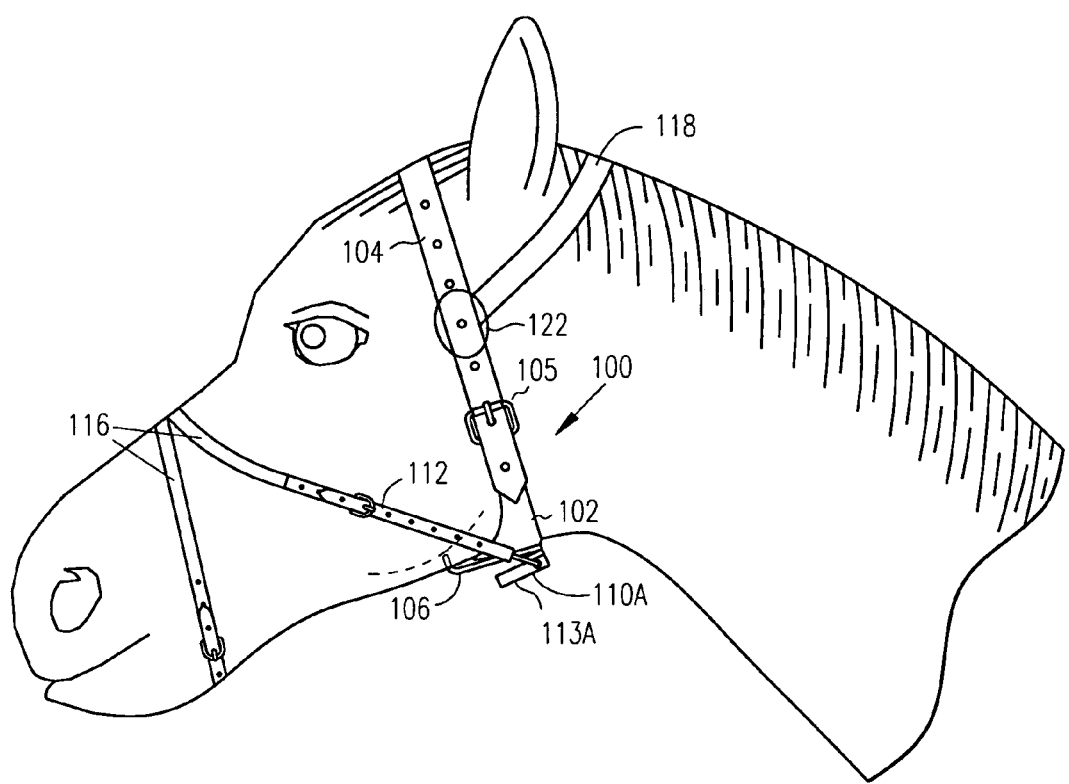
FIG. 1D is a simplified illustration of a throat support device in a place on an animal, the throat support having an adjusting mechanism comprising a headstrap used to elevate and lower the lifting mechanism, in accordance with one embodiment of the invention.

The one or more lifting straps 112 are secured or fastened to their respective securing devices 110 and 114 by any suitable means. In one embodiment, a loop configuration using any suitable securing means such as a snap, two strips of a hook and loop synthetic material that stick together ("hook and loop"), commonly sold under the trademark Velcro™, and the like, is used, although the invention is not so limited. In one embodiment, the one or more lifting straps 112 are instead threaded through the two securing devices (110A or 110B) and 114, with the ends of each lifting strap 112 secured with any suitable closure device, such as a buckle, snap, clip, hook and loop sections, and the like. In any of these embodiments, the one or more lifting straps 112 can also be further adjustable with an adjustment mechanism similar to the buckles used on backpack straps. In yet another embodiment, the second securing device 114 includes a loop of leather similar to the first securing device holder 113B shown in FIG. 1C. In another embodiment, a crimping device is used to secure the one or more lifting straps 112 to the second securing device holder 116. In yet another embodiment, the one or more lifting straps 112 are permanently affixed at one or both ends by any suitable means, such as a rivet or the like. In this way, the throat support device 100 can be permanently combined with the one or more lifting straps 112 as well as the second securing device holder 116 to create a complete throatlatch device. Such a device can be custom-sized for a particular animal or adjustable to accommodate any number of sizes. See, for example, FIG. 1D, in which there is one lifting strap 112 on each side (one shown), each permanently affixed at one end as described above, in this instance, on the end nearest the second securing device holder 116. Specifically, in the embodiment shown in FIG. 1D, each lifting strap 112 is permanently affixed to a second securing device holder 116, thus eliminating the need for the second securing devices 114. In this embodiment, the headstrap 104 serves as the adjustment mechanism, as described herein.

The one or more lifting straps 112 can be made from any suitable material, such as leather, nylon, and the like, or any combination thereof. The one or more lifting straps 112 can be any suitable size. In one embodiment, the one or more lifting straps 112 are about 20.3 to 38.1 cm (8 to 15 in) in length and any conventional width. In one embodiment, the one or more lifting straps 112 are elasticized. In the embodiment shown in FIGS. 1A and 1B, a portion of the one or more lifting straps 112 is made from rope, although any type of material can be used as long as this portion of the one or more lifting straps 112 can fit through the channel, i.e., the first securing device 110B in the first securing device holder 113B.

Any type of headgear (e.g., halter, bridle, noseband, etc.) can be used as the second securing device holder 116. Use of the nose portion of a figure-eight noseband for the second securing device holder 116, as shown in FIGS. 1A and 1C, provides certain enhancements to the ability of the throat support device 100 to treat DDSP since it is designed to decrease displacement of the soft palate. Specifically, when an animal wearing a figure-eight noseband opens its mouth, a positive pressure is creased in the mouth, thus pushing the soft palate upward. Since DDSP results in decreased ventilation, the level of oxygen in the blood decreases and the level of carbon dioxide increases, thus creating a level of discomfort, the figure-eight noseband encourages the animal to keep its mouth shut. In addition, the figure-eight nose band also helps to prevent the tongue from sliding over the bit, which is an important feature in the control of a horse during exercise. Otherwise, any type of securing means, including any type of bridle known in the art can be used as the second securing device holder 116. In the embodiment shown in FIG. 1C discussed above, the throat support device 100 further comprises a bit strap 150, which, in this instance, is used in addition to the figure-eight noseband. Use of the bit strap 150 allows the device to now be used as a bridle.

Although the first securing device holders 113A and 113B are shown in a centered position in relation to the main throat support section 102 in both FIGS. 1A and 1C, the invention is not so limited. In one embodiment, the first securing device holder 113A or 113B and the first securing device 110A and 110B are located more towards the rear of the main throat support section 102. In another embodiment, the first securing device holder 113A or 113B and the first securing device 110A or 110B are located more towards the front of the main throat support section 102. Either location is known to provide an appropriate vector force to help to keep the tip of the lifting mechanism 106 in place during use, depending on the shape of the animal's head. In some embodiments, the first securing device holder 113A or 113B is not a separate component, but is instead integral with the main throat support section 102. Virtually, any configuration is possible for the various components of the securing means as long as each lifting strap 112 is held in place. In yet another embodiment, each lifting strap 112 has some type of securing device on each end, such as a clip, snap, button, button-hole, etc., and is securable directly to a suitably located opposing part on the main throat support section 102 on one end and the second securing means 116 on the other end.

The main throat support section 102 can be any suitable shape and size as long as it can fit underneath the basihyoid bone or thyroid cartilage of the animal. If the main throat support section 102 is too wide for a particular animal, it cannot be pushed forward to the proper location. Animals having a thick jaw (i.e., a mandible that protrudes more laterally and caudally than usual, with the intermandibular width also greater than average) require an even narrower fit so that the throat support section 102 fits well or at least contacts the bottom of the throatlatch. In one embodiment, the main throat support section 102 is narrower along the side (See FIG. 1A) and widens only under the chin as can be seen in FIG. 1B. In another embodiment, the main throat support section 102 has a substantially L-shape when viewed from the side as shown in FIGS. 1C and 2 as it is wider along the sides as compared with the main throat support section 102 shown in FIG. 1A. It should be understood that any style of main throat support section 102 can be used with any of the embodiments described herein.

It should be noted that fitting the main throat support section 102 underneath the basihyoid bone is preferred so that the tip or tips of the lifting mechanism 106 can be placed immediately caudal to (adjacent to and behind) the basihyoid bone. It is thought that this position provides the maximum support. However, the conformation of certain horses is such that the distance between the basihyoid bone and thyroid cartilage is too narrow so that the main throat support section 102 is instead placed in back of the thyroid cartilage so that the tip of the lifting mechanism 106 can be placed immediately caudal to (adjacent to and behind) the thyroid cartilage. Alternatively, some animals appear to feel more comfortable having the tip of a lifting mechanism placed in back of their cricoid cartilage. For those animals, an additional or alternative lifting mechanism can be used, i.e., a cricoid plate 209, as shown in FIG. 2. The cricoid plate can optionally include a slot (not shown) to provide for longitudinal adjustability as is described below for the lifting mechanism 106 (See FIG. 3A). Due to the configuration of the cricoid plate 209 shown in FIG. 2, however, the adjustment mechanism can essentially be the headstrap 104, such that the cricoid plate 209 is tightened up against the animal by tightening the headstrap 104 a sufficient amount. However, in other embodiments, one or more adjustment mechanisms, such as the types shown in FIG. 1A or 1C (108A or 108B, respectively), are used to move the cricoid plate 209 in an upwardly direction. In other embodiments, any other type of adjustment mechanism can be used to properly secure the cricoid plate 209 in place. In one embodiment, the cricoid plate 209 has a rounded tip, although any suitable shape can be used as with the lifting mechanism 106 described below. As with the lifting mechanism 106, any suitable material, such as any type of plastic (e.g., thermoplastic) can be used for the cricoid plate 209 providing it has sufficient strength to perform the desired function of keeping pressure on the animal just behind the cricoid cartilage even during exercise. In one embodiment, the tip of the cricoid plate 209 is padded.

In all cases, however, with the throat support device 100 in place, caudal displacement of the basihyoid bone and the larynx (specifically, the thyroid cartilage) is prevented or minimized. Specifically, because the larynx is attached to the basihyoid bone through the thyrohyoid bone and selected musculature (e.g., thyrohyoid muscles) the unique design of the throat support device 100, with the option of having one or more lifting mechanisms, prevents caudal (backward) displacement of the larynx (specifically the thyroid cartilage) during exercise. In some embodiments, it may be that pressure on one location rather than another is preferred or use of a specific combination is preferred. For example, it may be that the most effective result (i.e., combination of most effective placement of basihyoid bone and larynx, with stability and comfort) is achieved by applying more upward pressure, while in other cases, more forward pressure is desired. Additionally, it may be more effective and/or comfortable to have the lifting mechanism in just one location, i.e., behind the basihyoid bone alone, the thyroid cartilage alone or the cricoid cartilage alone. Alternatively, applying pressure behind both the basihyoid bone and cricoid cartilage together may be more effective in some instances. Similarly, applying pressure behind the basihyoid bone and thyroid cartilage together may be more effective in other instances. Similarly, applying pressure behind the cricoid cartilage and thyroid cartilage together may be more effective. In some instances, it may be necessary or most effective to apply pressure behind all three locations, namely behind the basihyoid bone, the thyroid cartilage and the cricoid cartilage. It should be noted that in each of the instances where pressure is being applied in multiple locations, a single integrated lifting mechanism with two or more prongs can be used instead of multiple lifting mechanisms.

The headstrap 104 can be comprised of a conventional strap made from any conventional material, including, but not limited to leather, nylon, and so forth. The headstrap 104 can be any suitable length. In one embodiment, the headstrap 104 ranges in length from about 25.4 to 90.4 cm (10 to 36 in). The closure device 105 can be any known type of device designed to keep the headstrap 104 in place, particularly during exercise. In one embodiment, the closure device 105 is a buckle as shown in FIGS. 1A, 1C and 2. In other embodiments, a latch and hook closure means, clip, and the like, is used.

The lifting mechanism 106 is preferably a properly shaped and sized piece of rigid material with a tip that can fit adjacent to and behind either the basihyoid bone or thyroid cartilage and further maintain adequate pressure against the basihyoid bone or thyroid cartilage during use. In one embodiment, there are two lifting mechanisms 106, one for placement behind the basihyoid bone and one for placement behind the thyroid cartilage. Each lifting mechanism 106 can be bent at any suitable angle, depending on the configuration of the horse and the intended result. In some embodiments, each lifting mechanism 106 has a bend near one end that is less than 90 degrees down to nearly zero degrees. In other embodiments, each lifting mechanism 106 has a bend near one end that is more than 90 degrees, up to about 180 degrees. In one embodiment, there is one lifting mechanism 106 with a bend near one end that is substantially 90 degrees, as shown in FIG 1A. In an alternative embodiment there is one lifting mechanism 106 with a "fang-like" shape when viewed from the side, as shown in FIG. 1C and, i.e., an angle of between 30 and 70 degrees. It should be noted that in embodiments in which there are multiple lifting mechanisms 106, each can have a different configuration, as desired. The actual tip (See FIG. 3A) or point of contact with the animal can be any suitable shape, such as round, square, rectangular, triangular, elliptical, irregular, and so forth, as long as it can perform the intended function. If the tip is too large, it cannot fit into the desired area. If it is too small or pointed, it may cause excess discomfort and further may not be able to maintain the requisite pressure needed. Clearly it is important that the tip not be so small as to be able to penetrate the skin. In one embodiment, the tip of the lifting mechanism 106 impacting the animal is elliptical in shape with a major axis of between about two (2) and four (4) cm (0.8 and 1.6 in) and a minor axis or thickness of about 0.2 to 0.4 cm (0.08 to 0.16 in), with a preferred thickness of about 0.3 cm (0.12 in). In most embodiments, the tip of the lifting mechanism 106 is sufficiently padded to prevent discomfort to the animal at the pressure point, although the invention is not so limited.

The lifting mechanism 106 is designed to fit in back of the basihyoid bone or the thyroid cartilage when the adjustment mechanism 108A or 108B is turned in the appropriate direction a sufficient amount. The lifting mechanism 106 must not be placed too far behind the basihyoid bone or thyroid cartilage or will otherwise not be effective in performing its intended function. In one embodiment, the lifting mechanism 106 is placed between about 0.25 to one (1) cm (0.1 to 0.4 in) above the bottom of the basihyoid bone or thyroid cartilage or at a height ranging from about 10 to 50% of the height of these structures. In other embodiments, the throat support device 100 is used on a smaller animal, such as a dog and the lifting mechanism 106 is placed above the bottom of the basihyoid bone or thyroid cartilage at a height ranging from about 10 to 50% of the height of these structures.

The lifting mechanism 106 is preferably movable in relation to the animal in two directions, namely, from front to back and also in a generally upwardly and downwardly direction. The freedom of movement for the lifting mechanism 106 can be accomplished by any suitable means, including various types of known adjustment mechanisms. In one embodiment, the lifting mechanism 106 is preferably supported by a reinforcement section, such as a steel plate 330 (shown in FIG. 3A) located in the tongue portion of the main throat support section 102. In an alternative embodiment, there is an additional support for the lifting mechanism 106 that can be placed either above or below the lifting mechanism 106 as desired. In the embodiment in which the additional support is placed above the lifting mechanism 106, the lifting mechanism 106 can be slideable in between the base of the throat support section 102 and the additional support. In the embodiment shown in FIG. 1B, the first securing device holder 113A can also be used to provide the additional support. In this embodiment, the first securing device holder 113A is made from a material having sufficient strength to perform this function, such as any type of material discussed herein for the lifting mechanism 106 or the reinforcement section 330 (FIG. 3A), including any type of metal (e.g., steel) or thermoplastic.

In a particular embodiment, the lifting mechanism 106 itself has a slot 343 (see FIG. 3A) into which at least one securing screw 140 or 142 can be inserted through to an opening to fix the lifting mechanism 106 in place after it is properly positioned. In this way, the throat support device 100 can be adjusted to different sizes of horses. In another embodiment, it is possible to insert additional objects through the slot 343, such as a second securing screw 142 (shown in FIG. 2) to provide an additional means of securing one end of the lifting mechanism 106 in place.

In one embodiment, the securing screw 140 is any type of locking pin and the opening in the reinforcement section (see 330 in FIG. 3A) is not necessarily threaded. For example, in other embodiments, the securing screw 140 is any type of device capable of securing the lifting mechanism in place, such as a fastener with side wings. In the embodiment shown in FIG. 2, there are first and second securing screws, 140 and 142, respectively, in place. In other embodiments, the lifting mechanism 106 is custom made for a particular animal and can be permanently affixed to the main throat support section 102 in any suitable manner without the need for any securing screws.

As noted above, the lifting mechanism 106 is also necessarily adjustable in a generally upwardly and downwardly direction in order to properly position the tip against the desired location on the animal. As shown in FIGS. 1A, 1C and 2, the lifting mechanism 106 can be adjusted with the adjustment mechanism 108A or 108B. In the embodiments shown in FIGS. 1C and 2, the adjustment mechanism 108B is essentially a turn-screw that can be adjusted manually to the desired pressure, although the invention is not so limited. Any type of adjustment mechanism can be used, including any type of strap, such as a nosestrap or headstrap, (see, for example, the embodiment shown in FIG. 1D, in which the headstrap 104 serves as the adjustment mechanism), as well as the L-shaped adjustment mechanism 108A shown in FIG. 1A, depending on the particular situation. The adjustment mechanism 108A or 108B can be adjusted by any suitable amount required to perform its intended function, but should not be tightened pass the point of discomfort for the animal, which is noticeable when the animal vocalizes, bucks, kicks, cringes, or otherwise takes aversive action. In one embodiment, the adjustment mechanism 108A or 108B is tightened until there is about 20 to 300 mm of Hg of pressure being applied to the desired location, depending on many factors, including, but not limited to, the particular anatomy of the subject animal to which the pressure is being applied. In general, it is important to not over-tighten the headstrap 104 as the upper airway could otherwise become obstructed.

This amount of applied pressure should be sufficient to hold either the basihyoid bone or thyroid cartilage in place, even during strenuous exercise such as horseracing, without providing undue discomfort to the animal. In an alternative embodiment, the cricoid plate 209 is additionally or alternatively placed immediately caudal to the cricoid cartilage as described above. In certain embodiments, the cricoid plate 209 may be the sole structure used to keep the larynx and basihyoid bone forward. In other embodiments, it may be used in addition to the lifting mechanism 106. For example, the cricoid plate 209 can be used for added effectiveness or if the animal resents the "feel" of the lifting mechanism 106. As with the lifting mechanism 106, the cricoid plate 209 must also be placed sufficiently close behind its respective cartilage, if it is to function properly. In one embodiment, the cricoid plate 209 is placed between about 0.25 to one (1) cm above the bottom of the cricoid cartilage, corresponding to a distance of about 20 to 50% of its height, although the invention is not so limited. Sufficient pressure must also be applied. In one embodiment, the headstrap 104 is tightened until there is about 20 to 300 mm of Hg of pressure being applied behind the cricoid cartilage, depending on many factors, including, but not limited to, the particular anatomy of the subject animal to which the pressure is being applied. In yet another embodiment, two lifting mechanisms 106 for the two locations described above are used in addition to a cricoid plate 209 for the location just behind the cricoid cartilage. In yet another embodiment, a single combination lifting mechanism is used that can provide pressure behind the basihyoid bone, the thyroid cartilage and/or the cricoid cartilage, as desired.

FIG. 3A provides an inner or bottom view of one embodiment of the main throat support section 102 (without a cricoid plate 209) shown in FIG. 1C. Those skilled in the art will understand that other components may also be present, including, but not limited to, various rivets, stitching, and the like. For clarity, these details are omitted from the drawing.

In this embodiment, the main throat support section 102 has a centerline 320 as shown. Each half of the main throat support section 102 can be any suitable geometry and dimension, depending on the size and configuration of the animal the device is being used on. In one embodiment, the device is intended for use on an adult horse, such that there is a suitably sized curved portion in the center area that allows the throat support section 102 to fit properly against the basihyoid bone or thyroid cartilage of the animal. In one embodiment, the curved portion extends between about 3.8 and 6.4 cm (1.5 and 2.5 in) on either side of the centerline 320, such that distance 322 is between about 7.6 and 12.7 cm (three (3) and five (5) in). In this embodiment, distance 324, which represents about one-half the length of the main throat support section 102, is between about 15.2 and 25.4 cm (six (6) and ten (10) in), and distance 326, located on the side opposing distance 322, is between about 1.3 and 5.1 cm (0.5 and 2 in). In a particular embodiment, distance 322 is about 10.2 cm (four (4) in), distance 324 is about 19.5 cm (7.7 in) and distance 326 is about 2.5 cm (one (1) in).

The outline of the reinforcement section 330 can also be seen in FIG. 3A through which the adjustment mechanism 108B (not shown) is secured. The reinforcement section 330 is not easily malleable, providing sufficient stiffness as needed for the center portion of the main throat support section 102. The reinforcement section 330 can be any suitable regular or irregular shape. In one embodiment, the reinforcement section 330 is rectangular in shape and made from any suitable type of rigid material or rigid-reinforced material. In another embodiment, the reinforcement section 330 is shaped to match the shape of the main throat support section 102 in that location. In one embodiment, both the main throat support section 102 (in the area of the reinforcement section 330) and the reinforcement section 330 are triangular in shape. In one embodiment, the reinforcement section 330 is made from any suitable type of steel. In another embodiment, the reinforcement section 330 is made from a thermoplastic material having embedded metal treads to receive the securing screws 140 and 142. In one embodiment, the reinforcement section 330 is about two (2) to about 5.1 to 12.7 cm (about two (2) to three (3) in) in length and slightly less than distance 226 in width, such as about 1.3 to 2.5 cm (0.5 to one (1) in).

Within the reinforcement section 330 is an opening 328 designed to receive the adjustment mechanism 108B. In one embodiment, the opening 328 is threaded to receive a threaded adjustment mechanism 108B, such as a screw, which is designed to lift the lifting mechanism 106 upon contact. In most embodiments, the opening 328 is located within about the front third of the reinforcement section 330, but the invention is not so limited. The precise dimension and geometry of the opening 328 is also variable, depending on the particular adjustment mechanism 108 being used. Additionally, in most embodiments, the opening 328 is not in the area of the slot 343, but can be located on either side of the slot 343, if desired. In yet another embodiment, the opening 328 is located in the slot area, but the adjustment mechanism 108B is sufficiently large to not be able to slip through the slot, such that it can still raise the lifting mechanism upon contact with the outside edges of the slot 343.

The lifting mechanism 106 can be any suitable size and shape as noted above. In one embodiment, the lifting mechanism 106 is substantially rectangular, triangular or any type of irregular shape when viewed from the top. In one embodiment, the lifting mechanism 106 has a substantially bullet-like shape when viewed from the top as shown in FIG. 3A. In such an embodiment the lifting mechanism 106 includes an end portion, i.e., distance 342, which begins where the lifting mechanism 106 begins to taper in on both sides and continues until the tip 344. In one embodiment, distance 342 is between about 0.8 and 5.1 cm (0.3 and 2 (two) in), while the main portion 346 of the lifting mechanism 106 is between 3.8 and 10.2 cm (1.5 and four (4) in). In one embodiment, distance 342 is about 6.4 cm (2.5 in) and distance 346 is about 3.8 cm (1.5 in) such that the lifting mechanism 106 has an overall length (i.e., distance 342 plus distance 346) of about 10.2 cm (four (4) in). In another embodiment, distance 342 is about 0.8 cm (0.3 in) and distance 346 is about 6.4 cm (2.5 in), such that the lifting mechanism 106 has an overall length of about seven (7) cm (2.8 in).

The end portion 342 necessarily ends at the tip 344, i.e., the point of contact with the animal. As noted above, the tip 344 can have any suitable shape as long as it can fit into the desired area of the animal. The lifting mechanism 106 can be made from any suitable materials that are strong enough to withstand the forces that may be present during strenuous exercise with a large animal, such as a horse. However, the lifting mechanism 106 must also be sufficiently flexible so that it can flex and bend upwardly into position when adjusted by the adjustment mechanism. In one embodiment, any type of thermoplastic material, such as poly(ethane), polystyrene and polyvinyl chloride (PVC), and combinations thereof, is used. In another embodiment, any type of thermoset material, such as phenol-formaldehyde resins, epoxy resins, polyesters, polyurethane, silicones and combinations thereof are used. In other embodiments any type of metal, metal-reinforced leather, and the like can be used.

The lifting mechanism 106 can optionally be adjustable in a longitudinal direction. In the embodiment shown in FIG. 3A, the lifting mechanism 106 is slideable in a slot 343 as noted above. In this way the lifting mechanism 106 can be positioned more forward or rearward on the animal as needed. As with the slot 143 described above and shown in FIG. 1B, the slot 343 in FIG. 3A is substantially elliptically-shaped and oriented in a longitudinal direction, although the invention is not so limited. Any suitable shape can be used as long as the lifting mechanism 106 can move freely while being positioned on the animal. Such shapes include, but are not limited to, rectangular, circular or even triangular, which may provide additional adjustability in the lateral direction. In one embodiment, the slot 343 (or 143) is substantially elliptically shaped as shown with a major axis of between about 3.8 and 7.6 cm (1.5 and three (3) in) and a minor axis of between about 0.5 and 1.9 cm (0.2 and 0.75 in). In the above embodiment in which the lifting mechanism 106 has a length of about 8.9 cm (3.5 in), the major axis of the slot 343 can be about 5.1 cm (two (2) in) and the minor axis is about 0.6 cm (0.25 in).

Figure 4:
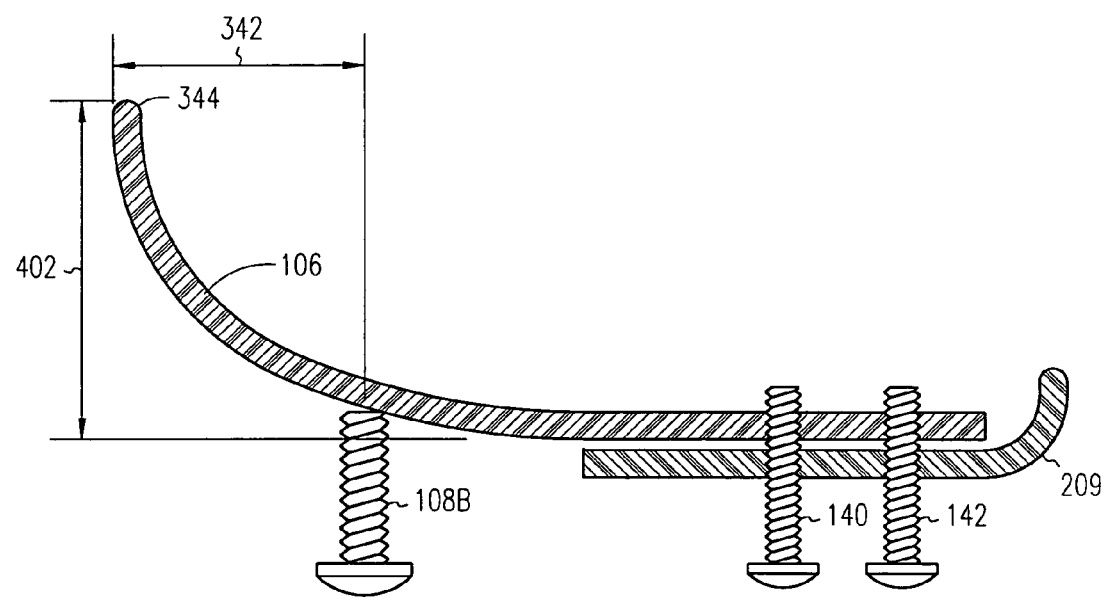
FIG. 4 is a side view of the adjustment mechanism shown in FIG. 1C, in accordance with one embodiment of the invention.

FIG. 4 provides a side view of the lifting mechanism 106 and cricoid plate 209 together with the adjustment mechanism 108B (shown in FIGS. 1C and 2) and first and second securing screws 140 and 142, respectively. As the adjustment mechanism 108B is turned, the end portion 342 of the lifting mechanism 106 is elevated. The portion that is to the rear of the animal remains fixed due to the presence of the first securing screw 140 as well as the second securing screw 142. The degree of elevation required is dependent on many factors, including the size of the animal, the amount of pressure needed, and so forth. In one embodiment, the end portion 342 of the lifting mechanism 106 is raised between about one (1) and three (3) cm (0.4 and 1.2 in), i.e., distance 402 is about one (1) to three (3) cm.

Referring again to FIG. 3A, the main throat support section 102 can further optionally include a larynx support or positioner 332 that can be shaped to conform to either side of the outer portion of an animal's larynx. The larynx support 332 can be any suitable size and shape as long as it can perform its intended function of providing additional means for positioning the larynx in addition to the lifting mechanism 106. In one embodiment it has a rectangular shape. In a particular embodiment, the larynx support 332 is about 12.7 to 17.8 cm (five (5) to seven (7) in) in length and about 1.3 to 3.8 cm (0.5 to 1.5 in) in width. The larynx support 332 can be made from a malleable steel such as stainless steel commonly used in surgical malleable retractors and provides additional support to the larynx, thus enhancing the corrective properties of the throat support device 100. Such enhancement may include increased comfort for the animal as well as improved fit of the throat support device 100. In most embodiments, however, it is expected that the lifting mechanism 106 alone can provide the requisite support.

Figure 3B:
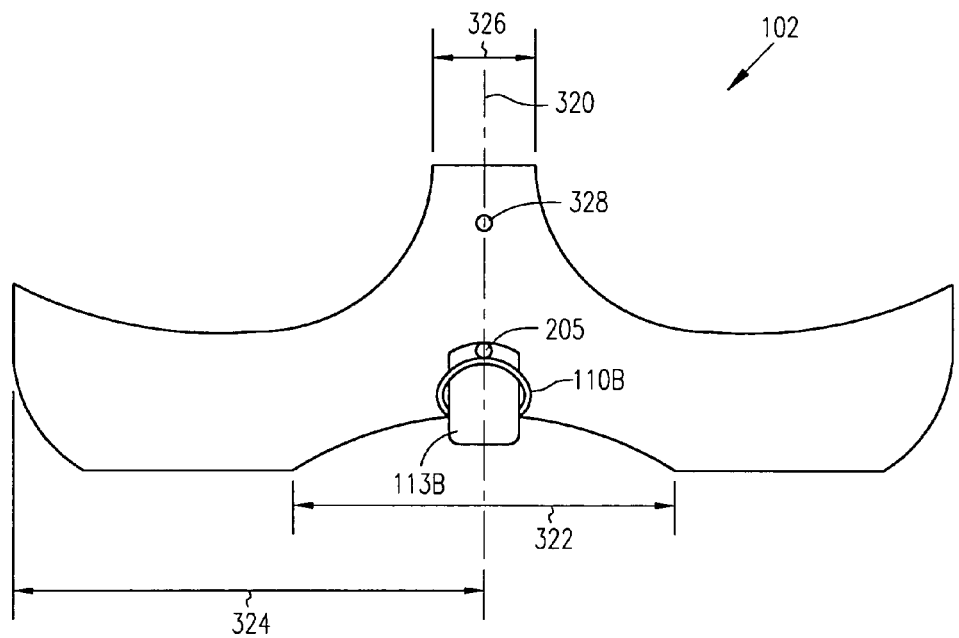
FIG. 3B is a top view of a main section of the throat support device of FIG. 3A, in accordance with one embodiment of the invention.

Referring now to FIG. 3B, an outer or top view of the main throat support section 102 is provided, again, with conventional details omitted. The first securing device 110B as well as the first securing device holder 113B can be seen. In one embodiment, the first securing device 110B is a conventional D-ring as noted above. In a particular embodiment, the D-ring has an inner major diameter of about 1.8 to 2 cm (0.7 to 0.8 in). Again, the first securing device holder 113B can be any suitable device, such as a suitably sized leather strap as is known in the art (or the rectangular block shown in FIG. 1A), that is permanently affixed to the main throat support section 102 such as with the securing means 205 as shown. Also visible in this view is the opening 326 through which the adjustment mechanism 108B is placed.

Figure 5:
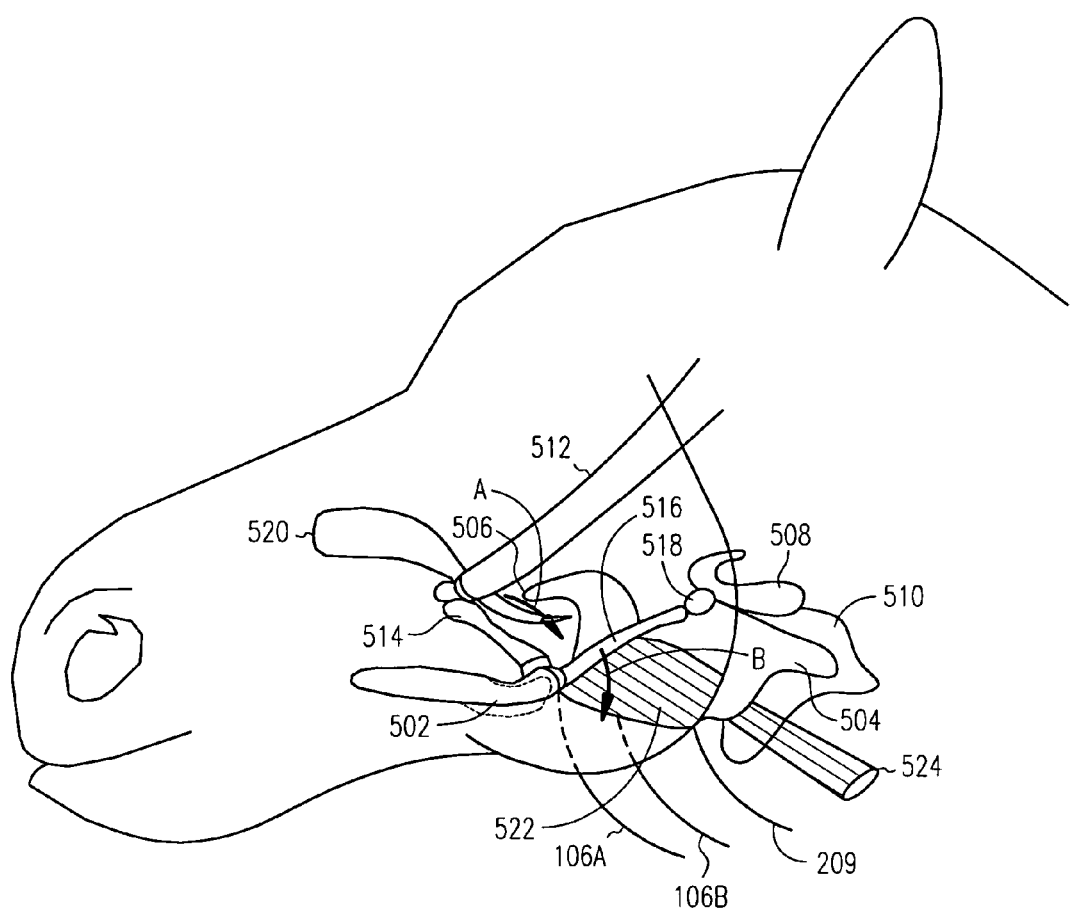
FIG. 5 is a simplified side view of lifting mechanisms contacting the throatlatch area in accordance with one embodiment of the invention.

FIG. 5 illustrates most of the various components of the horse's larynx and surrounding parts, showing where the various lifting mechanisms discussed herein impact. Lateral radiographs of the throatlatch area taken with and without the throat support device 100 in place confirm the positions of the various structures noted herein. It is thought that the lifting mechanism 106 functions by pushing up in the throatlatch area between each side of the mandible 505 (only one side of the mandible shown) and directly engaging either the basihyoid bone 502 or thyroid cartilage 504, moving these parts upward (dorsally) and forward (rostrally). It is further thought that the crioid plate 209 similarly engages the cricoid cartilage 510.

The larynx itself includes the thyroid cartilages 504 and cricoid cartilage 510 as well as an epiglottis or epiglottic cartilage 506 and arytenoids cartilage 508. Other portions of the larynx not shown include the vocal cords and ventricle. The supporting structures for the larynx include the basihyoid bone 502 as well as a stylohoid bone 512, ceratohyoid bone 514 and thyrohyoid bone 516, all of which pivot at the pivot point 518 shown in FIG. 5 (although each hyoid bone articulates with the adjacent bone giving a very small amount of laxity). A soft palate 520 is also present, with the most caudal (back) edge located underneath the tip of the epiglottis as shown.

Also present in the throatlatch area are thyrohyoideus muscles (hereinafter "thyrohyoid" muscles) 522, a pair of flat muscles located on each side of the thyroid cartilage portion of the larynx (only one shown in FIG. 5) and a pair of sternothyroid muscles 524 (only one shown in FIG. 5). More specifically, each thyrohyoid muscle 522 extends from the ipsilateral caudal border of the thyrohyoid bone 516 to the lateral surface of the lamina of the thyroid cartilage 504.

In briefly reviewing the interconnection of the above anatomy, the larynx is known to be suspended in a hyoid apparatus. The hyoid apparatus is composed of many bones, namely the tympanohyoid, stylohyoid, ceratohyoid, epihyoid, basihyoid and thyrohyoid bones. The larynx is also composed of many cartilages, namely the cricoid, epiglottic, arytenoid, corniculate and thyroid cartilages. The basihyoid bone is connected to the larynx through the left and right thyrohyoid bone attachment on each side of the thyroid cartilage. In addition, there are many soft tissues structures that connect the larynx to the hyoid apparatus. These are muscles such as the thyrohyoid muscles (left and right), which connect the thyrohyoid bone to the lateral surface of the thyrohyoid cartilage. There is also the hyoepiglotticus muscle that connects the basihyoid bone to the epiglottic cartilage. There are also mucosa, fascia and ligaments that connect the structures. Furthermore there is an articular surface at the dorsal aspect of the cricoid cartilage uniting the thyroid cartilage to the cricoid cartilage. In addition, there are paired muscles between the thyroid cartilage to the cricoid cartilage (cricothyroid muscles). These aforementioned structures result in an interrelationship between the basihyoid bone, the thyroid cartilage and the cricoid cartilage, such that these components move in unison if a vector force is applied to one of the three structures. Observation of horses exercising, with their basihyoid bone 502 and the thyroid cartilage 504 instrumented with strain gauges, has revealed that during maximal exercise, both structures move in unison caudally during inhalation and rostrally during exhalation. Intermittent DDSP was induced during exercise in 7 out of 10 horses by resection of the thyrohyoid muscles 522 in association with a more caudal position of the basihyoid bone 502. Further details of this testing can be found in Ducharme, N. G., et al, "Investigations into the Role of the Thyrohyoid Muscles in the Pathogenesis of Dorsal Displacement of the Soft Palate in Horses." Eq. Vet J. 35:258–263 (2003) incorporated herein by reference in its entirety.

From their anatomical location, it has been proposed that the function of the thyrohyoid muscles 522 is to keep the entire larynx forward and to pull the basihyoid bone 502 caudal toward the larynx. See "The Anatomy of Domestic Animals," by S. Sisson, Philadelphia (1975), pp. 376–453, which is hereby incorporated by reference in its entirety. Physiological studies in dogs at rest have shown that the thyrohyoid muscle does move the entire larynx rostrally. It is believed that during exercise, the critical function of the thyrohyoid muscles 522 in preventing DDSP is to draw the entire larynx rostrally such that the rostral aspect of the thyroid cartilages 504 become located just dorsal to the basihyoid bone 502. It is likely that dysfunction of the thyrohyoid muscles 522 leads to a more caudal and ventral position of the entire larynx in relationship to the basihyoid bone 502 thus positioning the thyroid cartilage 504 and epiglottis 506 in a more ventral location in relationship to the soft palate 520. This would also increase the distance between the caudal edge of the soft palate 520 and the ventral surface of the epiglottis 506. Both of these factors would facilitate the occurrence of DDSP during exercise. Alternatively, it is possible that this more rostral position of the larynx prevents DDSP in horses with neuromuscular disease of the nasopharynx.

CT scans of the throatlatch area have been performed on two anesthetized ponies. Specifically, transverse axial CT scans (PQS CT, Picker International, Inc., Cleveland, Ohio) of the pharynx and larynx areas were made with 5 mm slice thickness and 3 mm slice index during separate trials. Slices were obtained from the caudal aspect of the hard palate up to one (1) cm caudal to the cricoid cartilage. Image data was archived on 8 mm DAT media. Image data was transferred via network to a workstation (Voxel-Q, Picker International, Inc., St. Davids, Pa.) and multiplanar reformatting was used to create images in the longitudinal plane, using image-processing software. These tests were successful in being able to prevent stimulation of the thyrohyoid muscles while simultaneously stimulating other muscles. From both CT scans, it appears that the function of the thyrohyoid muscles is to keep the thyroid cartilage rostral and dorsal in relation to the basihyoid bone. Further, it appears using lead markers in the thyroid cartilage, the basihyoid bone and the bottom of the jaw, that when the thyrohyoid muscles are working, the rostral aspect of the thyroid cartilage is on top of the basihyoid bone, which indicates what is believed to be the optimal position of these structures for stability of the upper airway, at least in relation to the position of the soft palate.

The lifting mechanism 106 of the throat support device 100 described herein is presumed to operate by repositioning the basihyoid bone 502 as well as the entire larynx, by applying pressure to a number of locations, no matter whether it is placed caudal to the basihyoid bone (106A) or caudal to the thyroid cartilage (106B) as shown in FIG. 5. Specifically, the throat support device 100 applies pressure to the body of the thyroid cartilage 504 in order to keep the entire larynx positioned more dorsally. If the lifting mechanism 106 is placed caudal to the basihyoid bone (106A) it will cause rostral displacement of the basihyoid bone. Because of the attachment of the basihyoid bone 502 to the thyroid cartilage 504, as described above, this rostral displacement of the basihyoid bone 502 is transmitted to the thyroid cartilage 504 resulting in its rostral displacement. Further, the lifting mechanism (shown as 106B) can be placed directly caudal to the thyroid cartilage 502 to prevent it from retracting caudally (towards rear of body). Finally, an optional lifting mechanism, the cricoid plate 209, can be applied caudal to the cricoid cartilage 510, which, because of the junction between the cricoid cartilage 510 and thyroid cartilage 504, result in indirect movement of the thyroid cartilage 504 and the basihyoid bone 502.

FIG. 5 shows the alternative positions of some of the parts of a horse's larynx during DDSP. However, since some of the displacement is into or out of the paper (epiglottis) or only occurs when another component is displaced into or out of the paper (caudal edge of soft palate), not all movement is shown in FIG. 5. Specifically, the epiglottis is known to move ventrally and caudally (Arrow "A"), thus allowing the caudal edge soft palate 520 to be displaced dorsally with respect to the epiglottis 506 such that it is actually above the epiglottis 506. When this occurs, the soft palate 520 can actually vibrate as described above (vibration movement not shown). Additionally, the thyroid cartilage 504 would also move ventrally and caudally during DDSP (Arrow "B"). As a result, the distance between the caudal edge of the soft palate 520 and the rostral portion of the larynx, i.e., the thyroid cartilage 504, increases, thus facilitating the occurrence of DDSP. It is thought that restoration of the action of the thyrohyoid muscles 522 (by placement of the throat support device 100 adjacent to and behind, i.e., caudal, to either or even both of the basihyoid bone 502 and thyroid cartilage 504 (with the lifting mechanism 106), and/or the cricoid cartilage 510 (with the cricoid plate 209), depending on the individual animal's anatomy and preference, prevents DDSP and restores normal palatal function in horses during exercise.

The throat support device 100 can be used for many purposes, including for the treatment of DDSP in animals, particularly horses, as described herein. However, it is likely that the throat support device 100 can also treat this condition in other animals, such as dogs. Additionally, it is possible that the throat support device 100 can be used to treat other conditions other than DDSP, including but not limited to dynamic pharyngeal collapse (such as in horses), snoring and sleep apnea (including in humans), and the like. The device can also serve as a diagnostic tool, to aid in the detection of DDSP or other abnormalities and further to help identify prospective candidates for surgical repair of the condition.

Regarding DDSP, the condition is currently diagnosed by endoscopy at rest, after exercise, or by video-endoscopy during exercise. Historically, horses with DDSP have exercise intolerance generally toward the end of an athletic event resulting in an acute "choking-down." A noise during exercise is often heard and can be described as an expiratory flutter coming from the back of the throat. This noise is due to the vibration of the caudal edge of the soft palate during exhalation. In some horses, no noise is heard. If not wearing a figure-eight nose band, horses with DDSP during exercise can be observed to have billowing of the cheeks because of the airflow diverted to the oropharynx during exhalation. These clinical signs with endoscopic confirmation of the soft palate dorsal to the epiglottis despite multiple swallows with examination immediately after exercise is highly suggestive of the diagnosis. One should also evaluate the horse for anomalies that have been associated with DDSP (epiglottic flaccidity, palatal cyst, sub-epiglottic cyst, pharyngitis, arytenoepiglottic entrapment). Sometimes the diagnosis is made in the absence of other upper airway anomalies. All horses affected with DDSP typically have an endoscopic examination to check for the presence of inflammatory lesions to the nerve providing innervation to the soft palate. Indeed it has been shown that the decreasing prevalence of DDSP parallels the decreasing prevalence of pharyngitis suggesting the association of inflammation of the upper airway and DDSP. Further information on DDSP can be found in "Equine Surgery," by Holcombe and Ducharme, Philadelphia (1999), pp. 337–349, hereby incorporated by reference in their entirety.

Many investigators use a "Grade of Diagnosis" for deciding on a management path. As shown in Table 1, there are generally two inclusion criteria, namely, a history suggestive of DDSP and positive endoscopic findings. The suggestive history can include sudden decreases in performance during a race and one or more of the following signs, including, but not limited to, airflow through mouth, gurgling noises, horse choking down during the race and no other anomalies are found. Such positive endoscopic findings are defined as an occasional soft palate displacement when scoped, which persists despite two or more attempts to swallow or the presence of DDSP for at least eight seconds during exercise.

TABLE 1 grade of DDSP diagnosis

| Grade | Definition* |
|---|---|
| I | History suggestive of DDSP and Positive endoscopic diagnosis of DDSP during exercise. |
| II | History suggestive of DDSP and Positive endoscopic diagnosis of DDSP after training or exercise. |
| III | History suggestive of DDSP and Positive endoscopic diagnosis of DDSP at rest. |
| IV | History suggestive of DDSP only. |

*All assume that no cause of upper airway anomaly (dysfunction) is observed.

Figure 6:
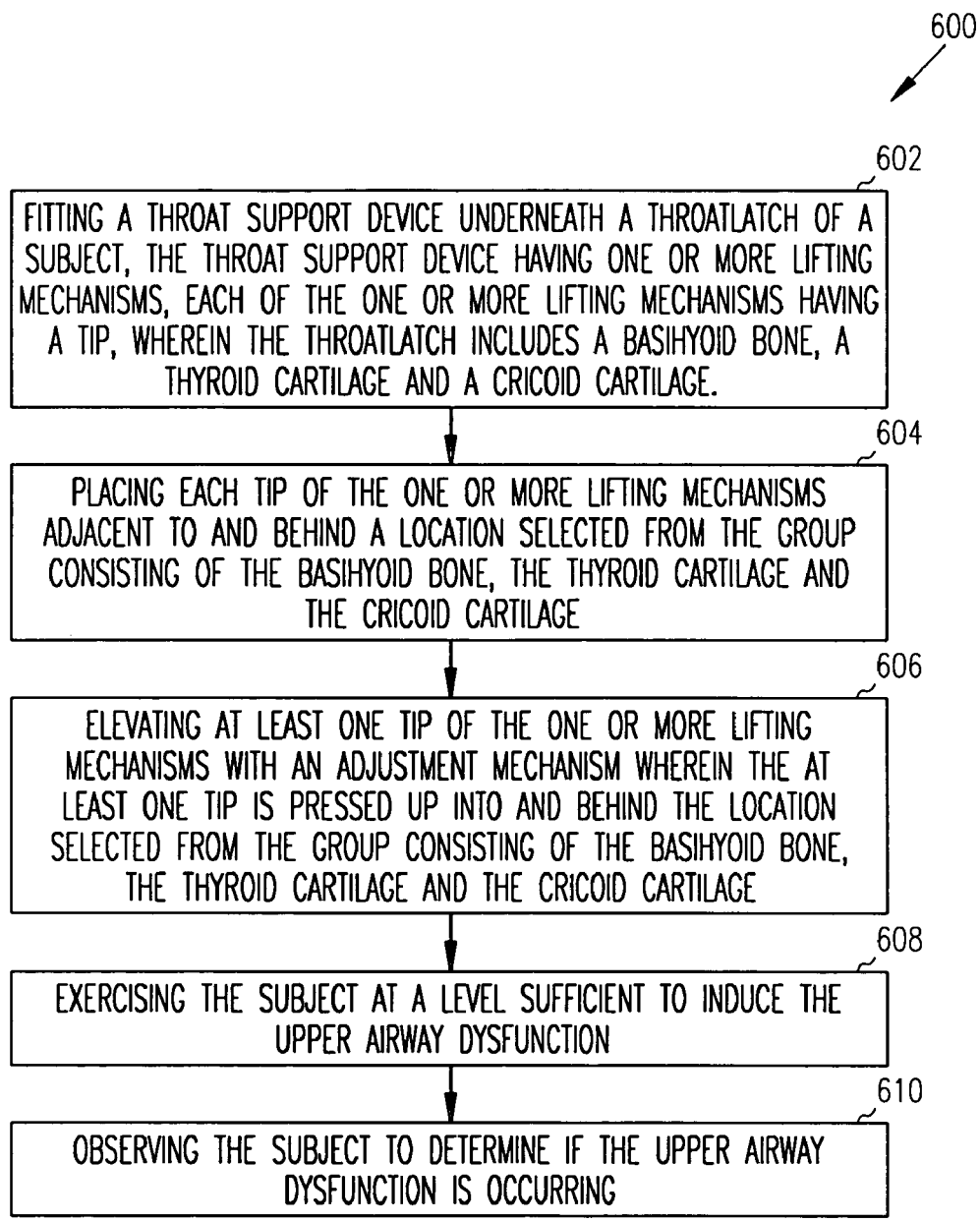
FIG. 6 is a block diagram of a method for diagnosing an upper airway dysfunction, in accordance with one embodiment of the invention.

FIG. 6 provides a block diagram of a method for diagnosing an upper airway dysfunction in a subject. The process 600 begins by fitting 602 a throat support device underneath a throatlatch of a subject, the throat support device having one or more lifting mechanisms, each of the one or more lifting mechanisms having a tip, wherein the throatlatch includes a basihyoid bone, a thyroid cartilage and a cricoid cartilage. The process continues by placing 604 each tip of the one or more lifting mechanisms adjacent to and behind a location selected from the group consisting of the basihyoid bone, the thyroid cartilage and the cricoid cartilage and elevating 606 at least one tip of the one or more lifting mechanisms with an adjustment mechanism wherein the at least one tip is pressed up into and behind the location selected from the group consisting of the basihyoid bone, the thyroid cartilage and the cricoid cartilage. The process continues by exercising 608 the subject at a level sufficient to induce the upper airway dysfunction and observing 610 the subject to determine if the upper airway dysfunction is occurring.

Figure 7:
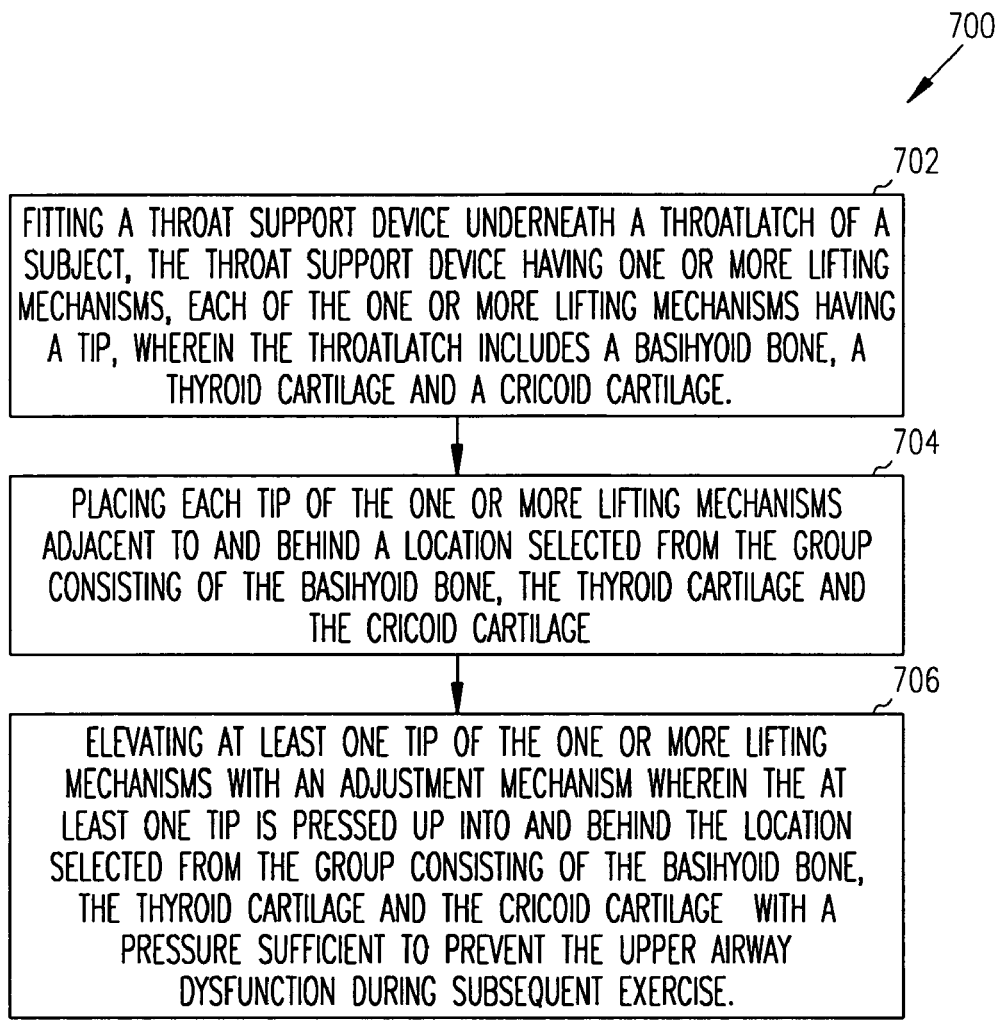
FIG. 7 is a block diagram of a method for treating an upper airway dysfunction or maintaining upper airway patency, in accordance with one embodiment of the invention.

FIG. 7 provides a block diagram for a method of treating an upper airway dysfunction or maintaining upper airway patency in an animal. The process 700 begins by fitting 702 a throat support device underneath a throatlatch of a subject, the throat support device having one or more lifting mechanisms, each of the one or more lifting mechanisms having a tip, wherein the throatlatch includes a basihyoid bone, a thyroid cartilage and a cricoid cartilage. The process continues by placing 704 each tip of the one or more lifting mechanisms adjacent to and behind a location selected from the group consisting of the basihyoid bone, the thyroid cartilage and the cricoid cartilage and elevating 706 at least one tip of the one or more lifting mechanisms with an adjustment mechanism wherein the at least one tip is pressed up into and behind the location selected from the group consisting of the basihyoid bone, the thyroid cartilage and the cricoid cartilage with a pressure sufficient to prevent the upper airway dysfunction or to maintain upper airway patency during subsequent exercise.

Figure 8:
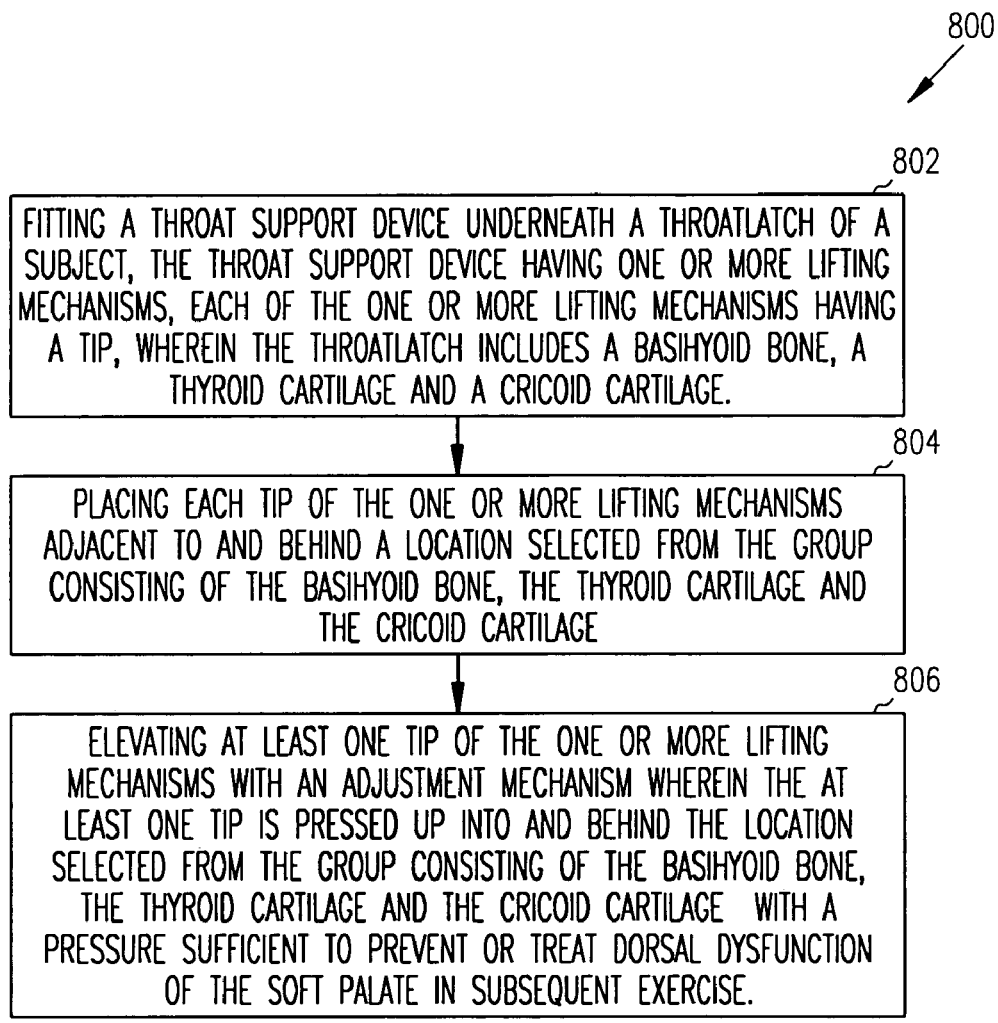
FIG. 8 is a block diagram of a method for treating or preventing dorsal displacement of a soft palate in a horse, in accordance with one embodiment of the invention.

FIG. 8 provides a block diagram for a method of treating or preventing a dorsal displacement of a soft palate. The process 800 begins by fitting 802 a throat support device underneath a throatlatch of a subject, the throat support device having one or more lifting mechanisms, each of the one or more lifting mechanisms having a tip, wherein the throatlatch includes a basihyoid bone, a thyroid cartilage and a cricoid cartilage. The process continues by placing 804 each tip of the one or more lifting mechanisms adjacent to and behind a location selected from the group consisting of the basihyoid bone, the thyroid cartilage and the cricoid cartilage and elevating 806 at least one tip of the one or more lifting mechanisms with an adjustment mechanism wherein the at least one tip is pressed up into and behind the location selected from the group consisting of the basihyoid bone, the thyroid cartilage and the cricoid cartilage with a pressure sufficient to prevent dorsal dysfunction of the soft palate in subsequent exercise.

The invention further includes a method comprising fitting a throat support device underneath a throatlatch of a subject, the throat support device having one or more lifting mechanisms, each of the one or more lifting mechanisms having a tip, wherein the throatlatch includes a basihyoid bone, thyroid cartilage and cricoid cartilage; placing each tip of the one or more lifting mechanisms adjacent to and behind a location selected from the group consisting of the basihyoid bone, the thyroid cartilage and the cricoid cartilage; and elevating each tip of the one or more lifting mechanisms with an adjustment mechanism wherein each tip is pressed up into and behind the location selected from the group consisting of the basihyoid bone, the thyroid cartilage and the cricoid cartilage with a pressure sufficient to control or prevent inappropriate swallowing, such as cribbing.

It should be noted that in experimental studies to date, the throat support device described herein has been effective in preventing DDSP in 13 of 14 trials (93%) in seven horses where DDSP was created. With further testing and adjustments to the device, the prevention rate may be even higher.

It is understood that the materials used for the various components can be any suitable type of conventional materials known in the art, such as leather, steel-reinforced leather, nylon, and so forth, depending on the type of device desired in terms of price, quality, ease of care, and so forth. It is also understood that any suitable fasteners can be used where needed, such as snaps, stitching, glues, buckles, and the like.

CONCLUSION

The throat support device of the present invention allows practitioners, for the first time, to easily, practically, and non-invasively diagnose, confirm and treat upper airway dysfunctions, maintain upper airway patency and avoid surgical treatment. This results in numerous benefits, not only for the animal itself, but also for their owners with regard to economic benefits. Specifically, an animal wearing a properly fitted throat support device will be able to function at a maximum level, leading to less down time and optimum performance during competition. In terms of racehorses and thoroughbreds, this can amount to hundreds of thousands of dollars or more. Unlike other throat supports known in the art for treating conditions such as cribbing, the throat support device of the present invention is designed to be small enough to fit properly in the throatlatch area and further to pull straight up on the throatlatch area of the animal, ensuring that the basihyoid bone is kept forward and the thyroid cartilage is kept more forward than otherwise and also dorsal to the basihyoid bone.

Although specific embodiments have been illustrated and described herein, it will be appreciated by those of ordinary skill in the art that any arrangement, which is calculated to achieve the same purpose may be substituted for the specific embodiments shown. For example, although the throat support device has been designed primarily in terms of use for treating and diagnosing DDSP in horses, the throat support device can also be used to treat and diagnose and confirm DDSP in other animals, as well as humans The throat support device can also be used to diagnose, prevent and treat other upper airway dysfunctions in other animals as well as humans. Examples including snoring, dynamic pharyngeal collapse, and the like. Of course modifications would need to be made in order to provide a proper fit for a particular animal species as well as for the various sizes of animals within a species. With regard to humans in particular, many modifications would need to be made. For example, size reduction would be needed. The need for the various headgear discussed herein (figure-eight nose strap, bridles, etc.) would be eliminated and the one or more lifting straps would likely rest on the front of the chin. Additionally, some type of chin rest with additional straps would be needed.

The invention can further be used to treat conditions such as inappropriate swallowing. Inappropriate swallowing occurs not only during exercise but also during cribbing (primarily in horses). Inappropriate swallowing occurs when excessive air is swallowed into or goes out of the stomach, thus resulting in an abnormal accumulation of gas in the stomach and possible colic or objectionable behavior.

This application is intended to cover any adaptations or variations of the present invention. Therefore, it is manifestly intended that this invention be limited only by the claims and the equivalents thereof.

What is claimed is:

1. A throat support device comprising:
   a main throat support section having one or more lifting mechanisms, each with a tip, each tip adapted to fit into a location immediately adjacent to and behind a basihyoid bone, a thyroid cartilage or a cricoid cartilage of an animal and adjustable in an upward direction to cause pressure to be applied to the location, wherein pressure applied to one or more locations is at a level sufficient to control upper airway dysfunction.

2. The device of claim 1 wherein the tip of at least one of the one or more lifting mechanisms is adjustable in an upward or downward direction with an adjustment mechanism.

3. The device of claim 2 wherein the adjustment mechanism is an adjusting screw or a headstrap.

4. The device of claim 2 wherein the adjustment mechanism is an L-shaped component.

5. The device of claim 4 wherein the adjustment mechanism contains a slot adapted to receive one or more securing screws, further wherein one of the one or more lifting mechanisms is slideable in a longitudinal direction when the securing screws are loosened or not present.

6. The device of claim 2 wherein the tip, when adjusted upwardly, applies pressure to the location immediately adjacent to and behind the basihyoid bone or the thyroid cartilage at a level sufficient to control the upper airway dysfunction.

7. The device of claim 6 wherein at least one of the one or more lifting mechanisms is a cricoid plate, further wherein the tip of the cricoid plate applies pressure to the location immediately adjacent to and behind the cricoid cartilage.

8. The device of claim 6 wherein the animal is a horse.

9. The device of claim 8 wherein each tip is placed about 0.25 to one (1) cm above the bottom of the basihyoid bone or thyroid cartilage.

10. The device of claim 6 wherein each tip of the one or more lifting mechanisms is substantially rounded.

11. The device of claim 10 wherein each tip has an elliptical shape with a major axis of between about two (2) and four (4) cm and a minor axis between about 0.2 and 0.4 cm.

12. The device of claim 10 wherein each tip of the one or more lifting mechanisms is padded.

13. The device of claim 6 wherein the upper airway dysfunction is dorsal displacement of a soft palate.

14. The device of claim 6 further comprising a headstrap connectable to the main throat support section to secure the main throat support section to the animal.

15. The device of claim 14 wherein dorsal displacement of the soft palate is prevented when the main throat support section and headstrap are in position on the animal and the one or more lifting mechanisms are applying sufficient pressure to the location immediately adjacent to and behind the basihyoid bone, the thyroid cartilage or the cricoid cartilage.

16. The device of claim 2 wherein the tip, when adjusted upwardly, applies pressure to the location immediately adjacent to and behind the basihyoid bone and the thyroid cartilage.

17. The device of claim 16 wherein at least one of the one or more lifting mechanisms is a cricoid plate, further wherein the tip of the cricoid plate applies pressure to the location immediately adjacent to and behind the cricoid cartilage.

18. The device of claim 2 wherein the one or more lifting mechanisms are made from a thermoplastic material.

19. The device of claim 2 further comprising a pair of lifting straps connectable to the main throat support section and to headgear located in front of the device to keep the main throat support section in place during movement by the animal.

20. The device of claim 19 wherein the headgear includes a figure-eight nose band.

21. The device of claim 2 wherein each of the one or more lifting mechanisms is also adjustable in position in a longitudinal direction.

22. The device of claim 21 wherein each of the one or more lifting mechanisms further have a longitudinal slot adapted to receive a securing screw, further wherein each of the one or more lifting mechanisms is slideable in a longitudinal direction when the securing screw is not present.

23. The device of claim 22 wherein the securing means comprises:

first and second securing devices;
first and second securing device holders to hold the first and second securing devices; and
one or more lifting straps securable between the first and second securing devices directly or indirectly.

24. The device of claim 23 wherein the first and second securing devices are D-rings.

25. The device of claim 23 wherein the first securing device holder is a rectangular block, the first securing device is a channel in the rectangular block and the second securing device is a buckle.

26. The device of claim 23 wherein the first securing device holder is a loop of material secured directly to the device.

27. The device of claim 26 wherein the second securing device holder is a figure-eight nose band.

28. The device of claim 27 further comprising a larynx positioner that provides side supports for the larynx.

29. The device of claim 1 wherein there is one lifting mechanism, further wherein the lifting mechanism is a cricoid plate having a tip adapted to apply pressure to the location immediately adjacent to and behind the cricoid cartilage.

30. The device of claim 29 wherein the tip is placed about 0.25 to one (1) cm above the bottom of the cricoid cartilage.

31. The device of claim 1 wherein about 20 to 300 mg of pressure is applied to the location.

32. A throat support device comprising:
lifting means having a tip for applying pressure immediately adjacent to and behind the basihyoid bone, thyroid cartilage or cricoid cartilage of an animal at a level sufficient to control upper airway dysfunction, the lifting means connectable to the device; and
securing means for securing the device in place in a forward direction.

33. The device of claim 32 wherein the lifting means comprises one or more lifting mechanisms, each lifting mechanism having a tip.

34. A device comprising:
a throat support device having one or more lifting mechanisms, each having a tip adapted to fit into a location immediately adjacent to and behind a basihyoid bone, a thyroid cartilage or a cricoid cartilage of an animal and adjustable in an upwardly direction to cause pressure to be applied to the location, wherein pressure applied to one or more locations is at a level sufficient to control upper airway dysfunction; and
one or more lifting straps securable to the throat support device.

35. The device of claim 34 wherein each of the one or more lifting straps is adjustable in size.

36. The device of claim 34 further comprising headgear, wherein each of the one or more lifting straps is also securable to the headgear.

37. A device comprising:
a throat support device having one or more lifting mechanisms, each having a tip adapted to fit into a location immediately adjacent to and behind a basihyoid bone, a thyroid cartilage or a cricoid cartilage of an animal and adjustable in an upwardly direction to cause pressure to be applied to the location, wherein pressure applied to one or more locations is at a level sufficient to control upper airway dysfunction;
headgear connectable to the throat support device; and
one or more lifting straps securable to the throat support device and the headgear.

38. The device of claim 37 wherein each of the one or more lifting straps is adjustable in size.

39. The device of claim 37 wherein the headgear is a figure-eight nose band.

40. The device of claim 37 wherein the headgear is a bridle.

41. A device comprising:
a throat support device having one or more lifting mechanisms, each having a tip adapted to fit into a location immediately adjacent to and behind a basihyoid bone, a thyroid cartilage or a cricoid cartilage of an animal and adjustable in an upwardly direction to cause pressure to be applied to the location, wherein pressure applied to one or more locations is at a level sufficient to control upper airway dysfunction; and
a bit strap connectable to the throat support device.

42. The device of claim 41 further comprising one or more lifting straps securable to the throat support device and to the bit strap.

43. The device of claim 42 further comprising a figure-eight nose band connectable to the throat support device.

44. A method of diagnosing an upper airway dysfunction comprising:
fitting a throat support device underneath a throatlatch of a subject, the throat support device having one or more lifting mechanisms, each of the one or more lifting mechanisms having a tip, wherein the throatlatch includes a basihyoid bone, a thyroid cartilage and a cricoid cartilage;
placing each tip of the one or more lifting mechanisms adjacent to and behind a location selected from the group consisting of the basihyoid bone, the thyroid cartilage and the cricoid cartilage;
elevating at least one tip of the one or more lifting mechanisms with an adjustment mechanism wherein the at least one tip is pressed up into and behind the location selected from the group consisting of the basihyoid bone, the thyroid cartilage and the cricoid cartilage;
exercising the subject at a level sufficient to induce the upper airway dysfunction; and
observing the subject to determine if the upper airway dysfunction is occurring.

45. The method of claim 44 wherein the upper airway dysfunction condition is dorsal displacement of a soft palate.

46. The method of claim 45 wherein the subject is a horse.

47. The method of claim 45 wherein the placing step comprises sliding the one or more lifting mechanisms backwards or forward.

48. The method of claim 47 wherein the elevating step comprises elevating each tip until about 20 to 300 mm of Hg of pressure is applied into and behind the location.

49. The method of claim 44 further comprising securing one or more lifting straps to the throat support device and to headgear.

50. The method of claim 49 wherein the headgear is a figure-eight nose band having a noseband D-ring, further wherein the one or more lifting straps are securable to the nose band with the nose band D-ring.

51. The method of claim 49 wherein the headgear is a bridle.

52. The method of claim 49 wherein the headgear further comprises a bridle.

53. The method of claim 52 wherein the throat support device further comprises a D-ring and the one or more lifting straps are securable to the throat support device with the D-ring.

54. The method of claim 52 wherein the throat support device further comprises a rectangular block and the one or more lifting straps are securable to the throat support device with the rectangular block.

55. A method of treating an upper airway dysfunction or maintaining upper airway patency in an animal comprising:
fitting a throat support device underneath a throatlatch of a subject, the throat support device having one or more lifting mechanisms, each with a tip, wherein the throatlatch includes a basihyoid bone, a thyroid cartilage and a cricoid cartilage;
placing each tip of the one or more lifting mechanisms adjacent to and behind a location selected from the group consisting of the basihyoid bone, the thyroid cartilage and the cricoid cartilage; and
elevating at least one tip of the one or more lifting mechanisms with an adjustment mechanism wherein the at least one tip is pressed up into and behind the location selected from the group consisting of basihyoid bone, the thyroid cartilage and the cricoid cartilage with a pressure sufficient to prevent the upper airway dysfunction or maintain upper airway patency during subsequent exercise.

56. The method of claim 55 wherein the animal is a horse and the upper airway dysfunction is dorsal displacement of a soft palate.

57. The method of claim 56 wherein the elevating step comprises elevating each tip until about 20 to 300 mm of Hg of pressure is applied into and behind the location.

58. A method of treating or preventing a dorsal displacement of a soft palate comprising:
fitting a throat support device underneath a throatlatch of a subject, the throat support device having one or more lifting mechanisms, each of the one or more lifting mechanisms having a tip, wherein the throatlatch includes a basihyoid bone, thyroid cartilage and cricoid cartilage;
placing each tip of the one or more lifting mechanisms adjacent to and behind a location selected from the group consisting of the basihyoid bone, the thyroid cartilage and the cricoid cartilage; and
elevating each tip of the one or more lifting mechanisms with an adjustment mechanism wherein each tip is pressed up into and behind the location selected from the group consisting of the basihyoid bone, the thyroid cartilage and the cricoid cartilage with a pressure sufficient to prevent or treat dorsal dysfunction of the soft palate during subsequent exercise.

59. The method of claim 58 wherein the subject is a horse.

60. The method of claim 58 wherein the throat support device is at least about 93% effective in treating dorsal displacement of the soft palate.

61. A method comprising:
fitting a throat support device underneath a throatlatch of a subject, the throat support device having one or more lifting mechanisms, each of the one or more lifting mechanisms having a tip, wherein the throatlatch includes a basihyoid bone, thyroid cartilage and cricoid cartilage;
placing each tip of the one or more lifting mechanisms adjacent to and behind a location selected from the group consisting of the basihyoid bone, the thyroid cartilage and the cricoid cartilage; and
elevating each tip of the one or more lifting mechanisms with an adjustment mechanism wherein each tip is pressed up into and behind the location selected from the group consisting of the basihyoid bone, the thyroid cartilage and the cricoid cartilage with a pressure sufficient to control inappropriate swallowing during exercise.

62. The method of claim 61 wherein the subject is a horse.

63. A throat support device comprising:
a main throat support section having one or more lifting mechanisms, each with a tip, each tip adapted to fit into a location immediately adjacent to and behind a basihyoid bone, a thyroid cartilage or a cricoid cartilage of an animal to control upper airway dysfunction, wherein the tip of at least one of the one or more lifting mechanisms is adjustable in an upwardly or downwardly direction with an L-shaped adjustment mechanism containing a slot adapted to receive one or more securing screws, further wherein one of the one or more lifting mechanisms is slideable in a longitudinal direction when the securing screws are loosened or not present.

64. The device of claim 63 further comprising headgear connectable to the throat support device.

65. The device of claim 63 further comprising a pair of lifting straps securable to the throat support device and the headgear.

66. The device of claim 63 further comprising a bit strap connectable to the throat support device.

67. The device of claim 63 wherein upper airway dysfunction is controlled when about 20 to 300 mg of pressure is applied to the location.

68. A throat support device comprising:
a main throat support section have one or more lifting mechanisms, each with a tip adapted to fit into a location immediately adjacent to and behind a basihyoid bone, a thyroid cartilage or a cricoid cartilage of an animal and adjustable in an upwardly direction to cause pressure to be applied to the location, wherein pressure applied to one or more locations is at a level sufficient to control upper airway dysfunction, wherein the tip is adjustable in an upwardly or downwardly direction with a headstrap.

69. The device of claim 68 wherein there is one lifting mechanism with a bend near one end of at least about 80 degrees.

70. The device of claim 69 further comprising a pair of lifting straps securable to the device on one end and permanently secured to headgear on an opposing end, the headgear located in front of the device.

71. The device of claim 70 wherein the headgear includes a figure-eight nose band.

* * * * *